(12) United States Patent
Kamatani et al.

(10) Patent No.: US 8,204,735 B2
(45) Date of Patent: Jun. 19, 2012

(54) MACHINE TRANSLATING APPARATUS, METHOD, AND COMPUTER PROGRAM PRODUCT

(75) Inventors: Satoshi Kamatani, Kanagawa (JP); Tetsuro Chino, Kanagawa (JP); Kazuo Sumita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 692 days.

(21) Appl. No.: 12/360,275

(22) Filed: Jan. 27, 2009

(65) Prior Publication Data

US 2009/0228263 A1 Sep. 10, 2009

(30) Foreign Application Priority Data

Mar. 7, 2008 (JP) ................................. 2008-058039

(51) Int. Cl.
*G06F 17/28* (2006.01)
(52) U.S. Cl. .............. 704/4; 704/2; 704/5; 704/8; 704/9
(58) Field of Classification Search .......................... None
See application file for complete search history.

(56) References Cited

U.S. PATENT DOCUMENTS

| | | | | |
|---|---|---|---|---|
| 5,559,693 | A * | 9/1996 | Anick et al. ................ | 704/9 |
| 2003/0036898 | A1* | 2/2003 | Duan et al. ................ | 704/2 |
| 2004/0167771 | A1* | 8/2004 | Duan et al. ................ | 704/10 |
| 2007/0118351 | A1 | 5/2007 | Sumita | |
| 2007/0150257 | A1* | 6/2007 | Cancedda et al. .......... | 704/2 |
| 2007/0265825 | A1* | 11/2007 | Cancedda et al. .......... | 704/2 |
| 2008/0077391 | A1 | 3/2008 | Chino et al. | |
| 2008/0208597 | A1 | 8/2008 | Chino et al. | |
| 2008/0306728 | A1 | 12/2008 | Kamatani et al. | |
| 2009/0012776 | A1 | 1/2009 | Chino et al. | |

FOREIGN PATENT DOCUMENTS

| | | |
|---|---|---|
| JP | 2001-222529 | 8/2001 |
| JP | 2006-053679 | 2/2006 |

* cited by examiner

*Primary Examiner* — Leonard Saint Cyr
(74) *Attorney, Agent, or Firm* — Turocy & Watson, LLP

(57) ABSTRACT

A machine translating apparatus includes an input unit that inputs a source language sentence, a syntax analyzing unit that performs a syntactic analysis on the source language sentence and generates syntax information, an extracting unit that extracts from the syntax information the first partial information that includes the first partial structure including all the nodes under the most significant nodes that are the nodes of the syntax information and the corresponding morphemes, and also extracts the second partial information including the second subtree representing a difference between two items of the first partial information and the corresponding morphemes, a translating unit that translates the morphemes of all the items of the partial information with multiple translation systems, and a most-plausible structure selecting unit that selects a combination for which the average of the translation scores takes the maximum value.

12 Claims, 17 Drawing Sheets

FIG.3

| WORD | GRAMMATICAL CATEGORY |
|---|---|
| 私 | N |
| は | CM |
| サイズ | N |
| が | CM |
| 大きい | ADJ |
| ので | CJP |
| 気に入っ | V |
| た | AUX |
| けど | CJP |
| やめ | V |
| ます | AUX |

FIG.4

| GRAMMATICAL RULE |
|---|
| S→NP VP |
| S→SP VP |
| VP→SP VP |
| VP→V AUX |
| SP→SP SP |
| SP→VP CJP |
| SP→AP CJP |
| NP→N CM |
| AP→NP ADJ |
| AP→NP AP |
| ⋮ |

| NODE (PARENT) | NODE (CHILD) | PARTIAL CHARACTER STRING | PARTIAL TRANSLATION | TRANSLATION SCORE | TRANSLATION SYSTEM |
|---|---|---|---|---|---|
| S25a | | 私はサイズが大きいので気に入ったけどやめます | Since I am large size, although it is pleased, I stop. | 0.6 | 1 |
| S25a | | 私はサイズが大きいので気に入ったけどやめます | | 0 | 2 |
| SP16 | | サイズが大きいので | It's so big for me. | 0.8 | 2 |
| SP19 | | 気に入ったけど | I like it, but. | 0.4 | 1 |
| ... | ... | ... | ... | ... | ... |
| S25a | SP16 | 私は気に入ったけどやめます | Although I love it, I give it up. | 0.5 | 2 |
| S25a | SP20 | 私はやめます | I just can't buy it. | 0.9 | 2 |
| VP24a | SP19 | サイズが大きいのでやめます | Because size is large, I stop. | 0.7 | 1 |
| ... | | | | ... | ... |

1401
1402
1403
1404
1405
1406

123

MACHINE TRANSLATING APPARATUS, METHOD, AND COMPUTER PROGRAM PRODUCT

CROSS-REFERENCE TO RELATED APPLICATIONS

This application is based upon and claims the benefit of priority from the prior Japanese Patent Application No. 2008-58039, filed on Mar. 7, 2008; the entire contents of which are incorporated herein by reference.

BACKGROUND OF THE INVENTION

1. Field of the Invention

The present invention relates to an apparatus, a method, and a computer program product for machine translating a sentence that is input in a source language into a sentence in a target language.

2. Description of the Related Art

As the progress of the natural language processing technology goes forward, machine translating apparatuses that convert a sentence input in the first language (source language) and output a sentence in the second language (target language) have been developed. Among those apparatuses, a machine translation system for translating a text in Japanese to other languages such as English and Chinese has been in practical use. Although many translation systems have been suggested for such translating devices, no system has yet been realized that can generate appropriate interpretation for every sentence.

In machine translation, natural language processing technologies including a morphological analysis and a syntactic analysis (dependency analysis) are adopted. As one of the approaches to realizing a high-precision translating machine, it is important to improve the processing precision in each of these technologies. For example, JP-A 2006-53679 (KOKAI) suggests a natural language analyzing device that can offer translation processing with high precision. According to this technology, parse trees included in a parse forest are not individually evaluated, but are entirely subjected to a dependency analysis so that the most plausible interpretation can be selected from among multiple options without falling into a local optimum.

Furthermore, as an approach to realizing high-precision translation, a translating device that translates a sentence of a source language by combining different translation systems has been suggested. For example, JP-A 2001-222529 (KOKAI) suggests a translation technology, with which a sentence input in a source language is segmented into substrings based on the surface patterns of the input sentence, the translation systems are switched around to be operated by selecting the most suitable translation system for each substring, and the translation results are integrated to obtain a translation of the whole sentence.

According to JP-A 2001-222529 (KOKAI), however, the input sentence is segmented in a one-dimensional manner by using its surface patterns such as phrases and clauses as units. For this reason, there is a possibility of restricting types of segmentation patterns and segmenting the sentence in units that are not suitable for the translation. This may hinder improvements in the quality of the translation.

SUMMARY OF THE INVENTION

According to one aspect of the present invention, a machine translating apparatus includes an input unit that inputs a source language sentence in a source language; a morpheme analyzing unit that performs a morphological analysis on the source language sentence and outputs a sequence of morphemes of the source language sentence; a syntax analyzing unit that performs a syntactic analysis on the morphemes of the source language sentence and outputs a syntactic structure of the source language sentence; a first extracting unit that extracts from the syntactic structure, when first nodes included in the syntactic structure serve as significant nodes, a first sub-string that corresponds to a first partial structure including all leaf-ward nodes to be unified into each of the first nodes; a second extracting unit that extracts from the syntactic structure, when second nodes which have a direct or indirect grammatical relation with the first nodes serve as the significant nodes, a second sub-string that corresponds to a second partial structure representing a difference between a partial structure including all leaf-ward nodes to be unified into each of the second nodes and the first partial structure; a translating unit that translates the first sub-string and the second sub-string into a target language with each of a plurality of translation systems, and generates partial translation information in which a translation score representing translation certainty is associated with a translation result; a selecting unit that selects a combination from a plurality of combinations of items of the partial translation information, wherein the combination to be selected meets conditions that the first sub-string and the second sub-string that are originals of translation results included in items of the partial translation information do not overlap each other, that each of morphemes included in the source language sentence match one of the first sub-string and the second sub-string that are the originals of the translation results included in the partial translation information in the combination, and that a first plausibility calculated based on the translation score included in the partial translation information to indicate certainty of the combination takes a largest value; a generating unit that generates a target language sentence in the target language as a result of translating the source language sentence in a manner that the target language sentence has the translation results included in the partial translation information in the selected combination; and an output unit that outputs the target language sentence.

According to another aspect of the present invention, a machine translating method includes inputting a source language sentence in a source language; performing a morphological analysis on the source language sentence and outputting a sequence of morphemes of the source language sentence; performing a syntactic analysis on the morphemes of the source language sentence and outputting a syntactic structure of the source language sentence; extracting from the syntactic structure, when first nodes included in the syntactic structure serve as significant nodes, a first sub-string that corresponds to a first partial structure including all leaf-ward nodes to be unified into each of the first nodes; extracting from the syntactic structure, when second nodes which have a direct or indirect grammatical relation with the first nodes serve as the significant nodes, a second sub-string that corresponds to a second partial structure representing a difference between a partial structure including all leaf-ward nodes to be unified into each of the second nodes and the first partial structure; translating the first sub-string and the second sub-string into a target language with each of a plurality of translation systems, and generating partial translation information in which a translation score representing translation certainty is associated with a translation result; selecting a combination from a plurality of combinations of items of the partial translation information, wherein the combination to be selected meets conditions that the first sub-string and the second substring that are originals of translation results included in items of the partial translation information do not overlap each other, that each of morphemes included in the source language sentence match one of the first sub-string and the second sub-string that are the originals of the translation results included in the partial translation information in the combination, and that a first plausibility calculated based on the translation score included in the partial translation information to indicate certainty of the combination takes a largest value; generating a target language sentence in the target language as a result of translating the source language sentence in a manner that the target language sentence has the translation results included in the partial translation information in the selected combination; and outputting the target language sentence.

A computer program product according to still another aspect of the present invention causes a computer to perform the method according to the present invention.

BRIEF DESCRIPTION OF THE DRAWINGS

FIG. 3 is a diagram for showing an example data structure of a vocabulary dictionary stored in a dictionary storage unit;

FIG. 4 is a diagram for showing an example data structure of grammatical rules stored in a rule storage unit;

FIG. 14 is a diagram for showing an example data structure of partial translation information stored in a partial translation storage unit;

DETAILED DESCRIPTION OF THE INVENTION

Exemplary embodiments of an apparatus, a method, and a computer program product according to the present invention are explained in detail below with reference to the attached drawings. In the following explanation, an example of translation between Japanese and English is employed. However, languages that are dealt with in the translation process are not limited to those two languages, and a combination of any languages can be incorporated.

The machine translating apparatus according to an embodiment of the present invention syntactically analyzes a sentence that is input in a source language (hereinafter, "source language sentence"), and segments the source language sentence into units that are suitable for the translation by using syntax information obtained as a result of the syntactic analysis. Then, character strings obtained from the segmentation (hereinafter, "partial character strings") are individually translated with different translation systems, and the translation results having the largest plausibility (translation score) that indicates the certainty of the translation are integrated. The input source language sentence is thereby translated with high precision.

According to JP-A 2001-222529 (KOKAI), multiple translation systems are switched around by selecting a suitable system. According to this method, however, every possible source language sentence needs to be considered, and a method of cutting out partial character strings and a system of translating these strings in the best manner need to be selected in advance. A translating device incorporating such a method requires enormous efforts to develop. Furthermore, if any of the translation systems is updated, all the rules have to be reviewed. This makes it difficult to reflect improvements made in individual translation systems on the entire translating device.

In contrast, the machine translating apparatus according to the present embodiment translates partial character strings by use of all the translation systems, and integrates the translation results with the translation system having the highest translation score to complete the translation. For this reason, a translation system does not need to be selected in advance for each of the cut-out partial character strings. Hence, the best capacities of different translation systems can be drawn out, and improvements individually made in the translation systems can be directly reflected on the entire translation to improve its quality.

Figure 1:
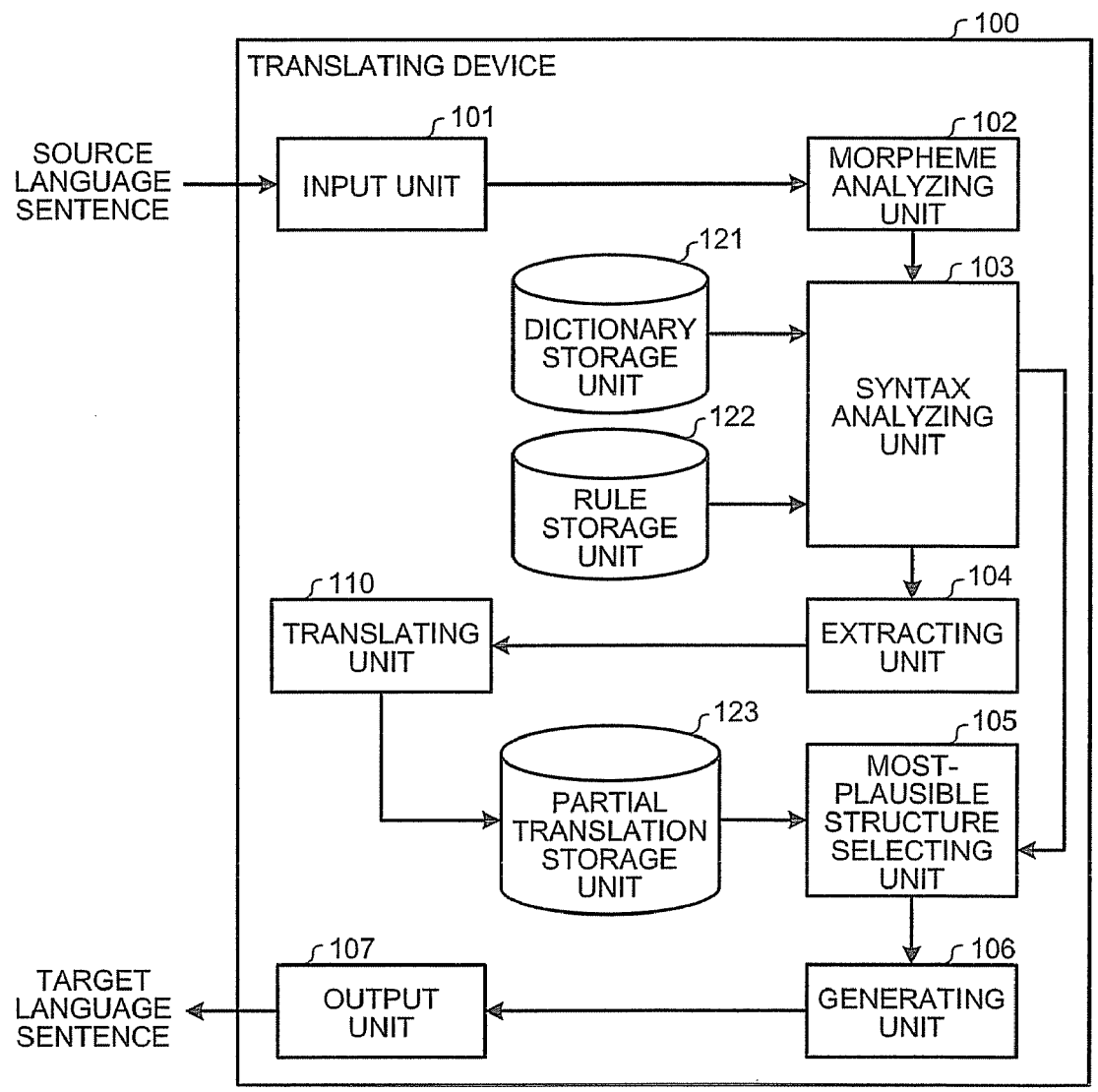
FIG. 1 is a block diagram for showing a structure of a machine translating apparatus according to an embodiment of the present invention.

As illustrated in FIG. 1, a machine translating apparatus 100 includes an input unit 101, a morpheme analyzing unit 102, a dictionary storage unit 121, a rule storage unit 122, a syntax analyzing unit 103, an extracting unit 104, a translating unit 110, a partial translation storage unit 123, a most-plausible structure selecting unit 105, a generating unit 106, and an output unit 107.

The input unit 101 receives a source language sentence input by a user. The source language sentence may be input with any commonly used input means, such as a keyboard, a pointing device, hand-written character recognition, an optical character recognition (OCR), and voice recognition.

The morpheme analyzing unit 102 conducts a morphological analysis onto the received source language sentence, and outputs sequense of morphemes of the source language sentence as a result of the analysis. In the morphological analyzing process conducted by the morpheme analyzing unit 102, any morphological analyzing technology that is conventionally used can be adopted, such as a minimum connective-cost method and a method of maximizing the segmentation probability by dynamic programming by use of a word segmentation model.

Figure 2:
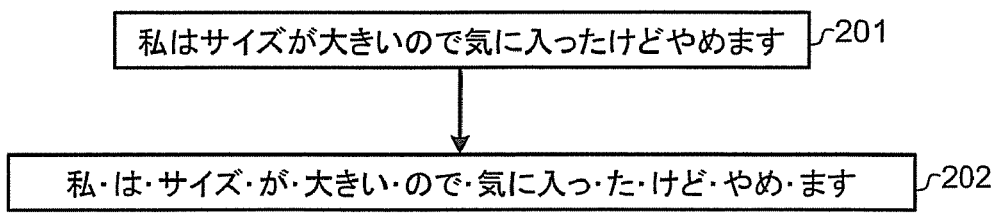
FIG. 2 is a diagram for showing an example of an analysis result obtained by a morpheme analyzing unit.

In the example of FIG. 2, a source language sentence 201 is a Japanese sentence "watashi wa saizu ga ookii node kiniitta kedo yamemasu", and a morpheme string 202 shows the result of analyzing this sentence. The breakpoints between the morphemes of the morpheme string 202 are designated by a symbol "•".

In FIG. 1, the dictionary storage unit 121 stores therein a vocabulary dictionary that is referred to when the syntax analyzing unit 103 (described later) conducts a syntax analyzing process. In FIG. 3, examples of grammatical categories of the morphemes of the morpheme string 202 shown in FIG. 2 are provided.

As shown in FIG. 3, the vocabulary dictionary includes words and grammatical categories of the words in association with one another. For example, a Japanese word 301 representing "I, me" is associated with a grammatical category N (noun). Besides N (noun), the grammatical categories for the vocabulary include CM (case marker), ADJ (adjective), CJP (conjunctive particle), V (verb), and AUX (auxiliary verb).

In FIG. 1, the rule storage unit 122 stores therein grammatical rules that are referred to when the syntax analyzing unit 103 (described later) conducts the syntax analyzing process.

As illustrated in FIG. 4, the rule storage unit 122 stores therein grammatical rules described, for example, in the form of "(grammatical category)→(grammatical category 1 grammatical category 2)". In this list of the grammatical rules, it is specified that the grammatical category on the left side of the arrow is constituted with grammatical categories 1 and 2 described on the right side of the arrow.

For example, according to a grammatical rule 401, a sentence (grammatical category S) is constituted with a noun phrase (grammatical category NP) and a verb phrase (grammatical category VP). Moreover, according to a grammatical rule 402, a sentence (S) is constituted with a subordinate phrase (grammatical category SP) and a verb phrase (grammatical category VP). According to a grammatical rule 403, a subordinate phrase (grammatical category SP) is constituted with an adjective phrase (grammatical category AP) and a conjunctive particle (grammatical category CJP).

The dictionary storage unit 121 and the rule storage unit 122 may be configured with any commonly used recording medium, such as a hard disk drive (HDD), an optical disk, a memory card, and a random access memory (RAM).

In FIG. 1, the syntax analyzing unit 103 receives the morphemes output by the morpheme analyzing unit 102, and executes the syntax analyzing process onto the received morphemes, as a result of which a graph indicating the syntactic structure of the source language sentence is output. The syntax analyzing unit 103 refers to the vocabulary dictionary stored in the dictionary storage unit 121 and the grammatical rules stored in the rule storage unit 122 at the time of the syntax analyzing process. In the syntax analyzing process conducted by the syntax analyzing unit 103, any conventional syntax analyzing method, such as chart parsing and generalized LR parsing, may be adopted.

The syntax analyzing unit 103 outputs a graph that indicates at least one syntactic structure that shows the syntactic and semantic relationship in the morpheme string. The structure that is described as a parse tree represents an interpretation regarding relationships of possible morphemes included in the morpheme string. This means that, depending on a morpheme string and a grammatical rule by which the morpheme string is analyzed, a single source language sentence may take more than one possible interpretation, or in other words more than one parse tree.

The present invention according to the embodiment offers robustness against syntactic and semantic ambiguities. To realize this purpose, the following explanation is given by using a syntactic analysis incorporating generalized LR parsing as an example. Generalized LR parsing is a method with which all the grammatically plausible syntactic options of an input sentence are concurrently analyzed by referring to context-free grammar, and syntax information of the input sentence is output in the form of a packed shared forest (hereinafter, simply "parse forest").

Figure 5:
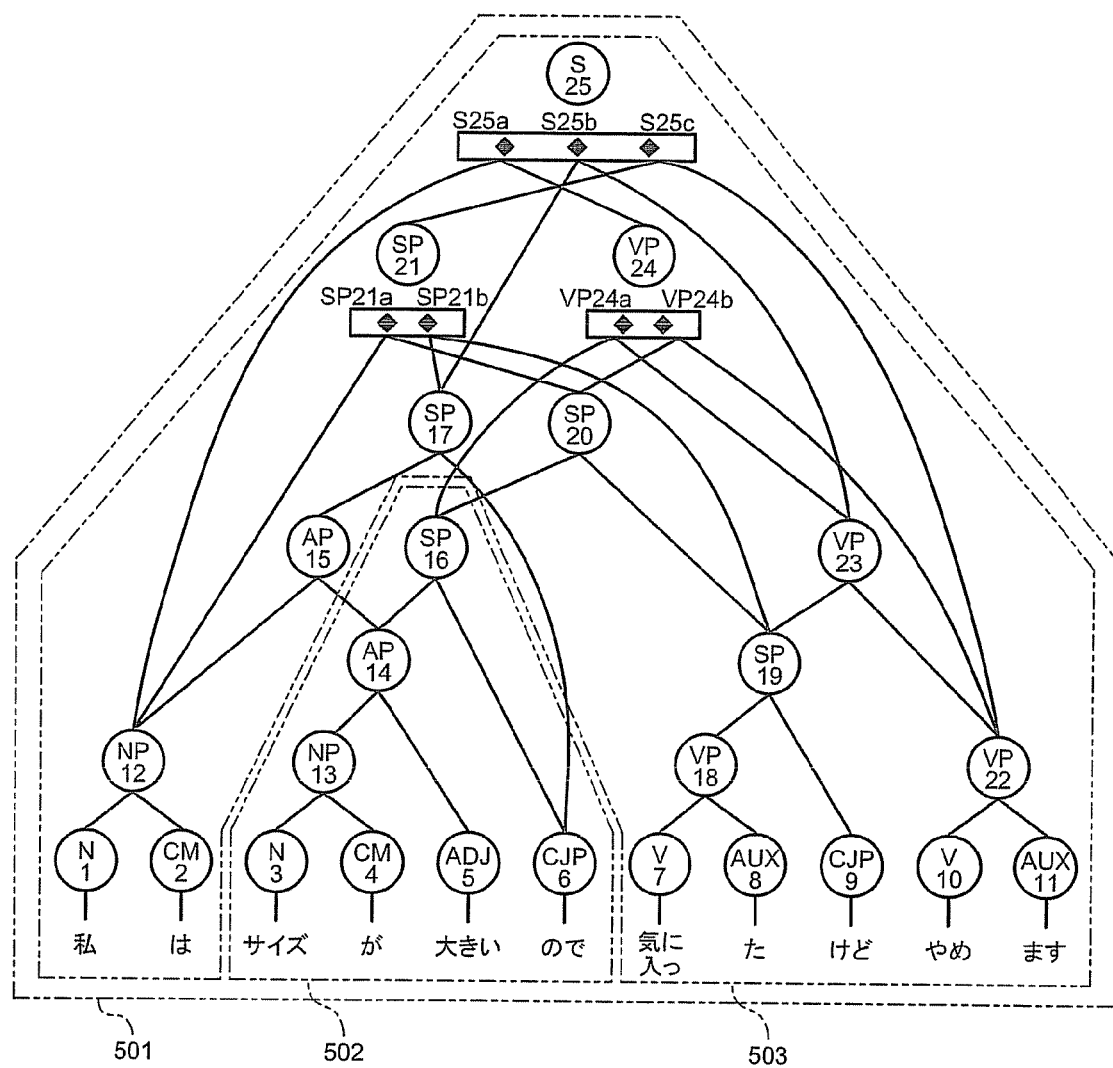
FIG. 5 is a diagram for showing an example of a parse forest output by a syntax analyzing unit.
Figure 6:
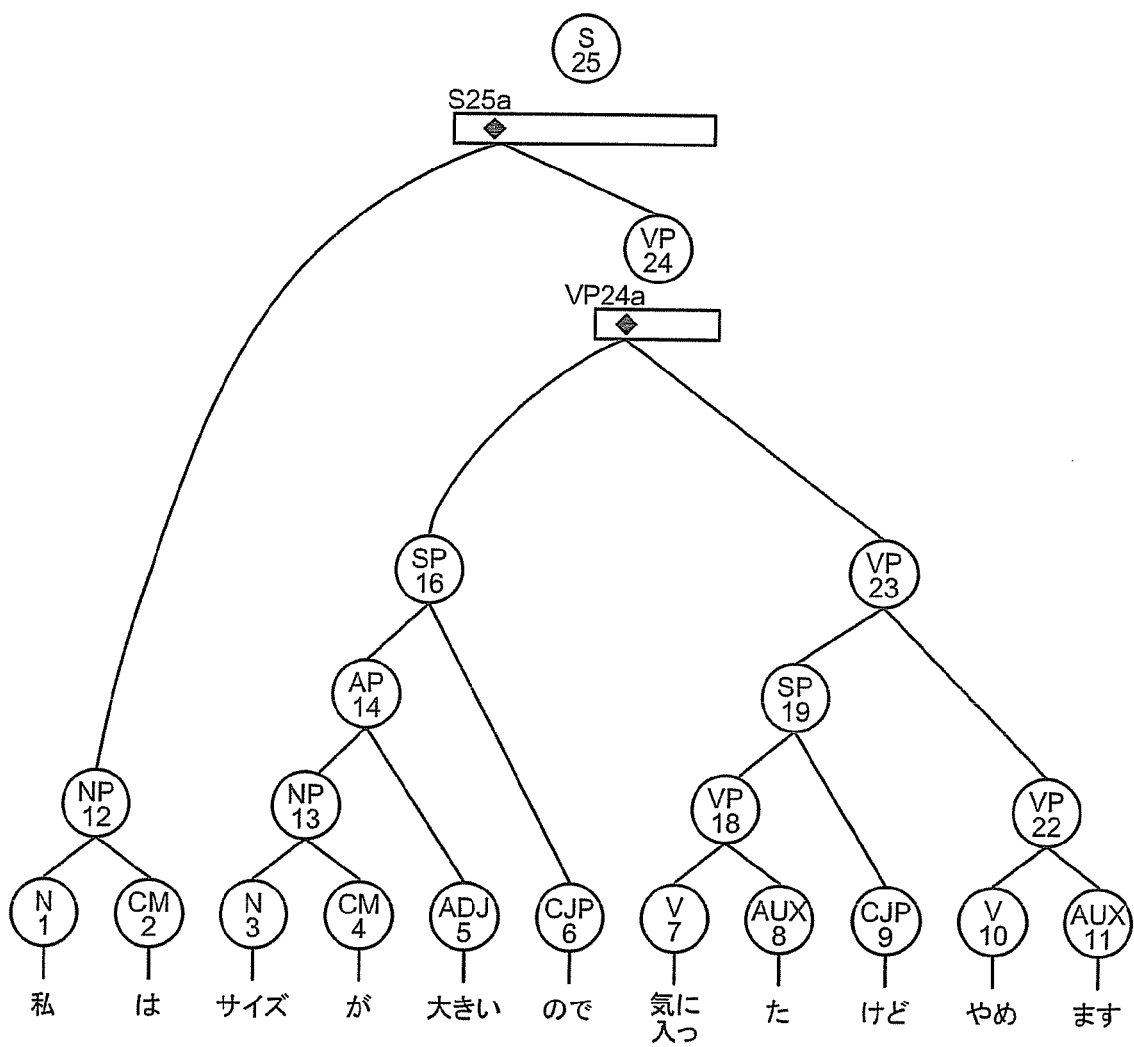
FIG. 6 is a diagram for showing an example of a parse tree in the parse forest of FIG. 5.
Figure 7:
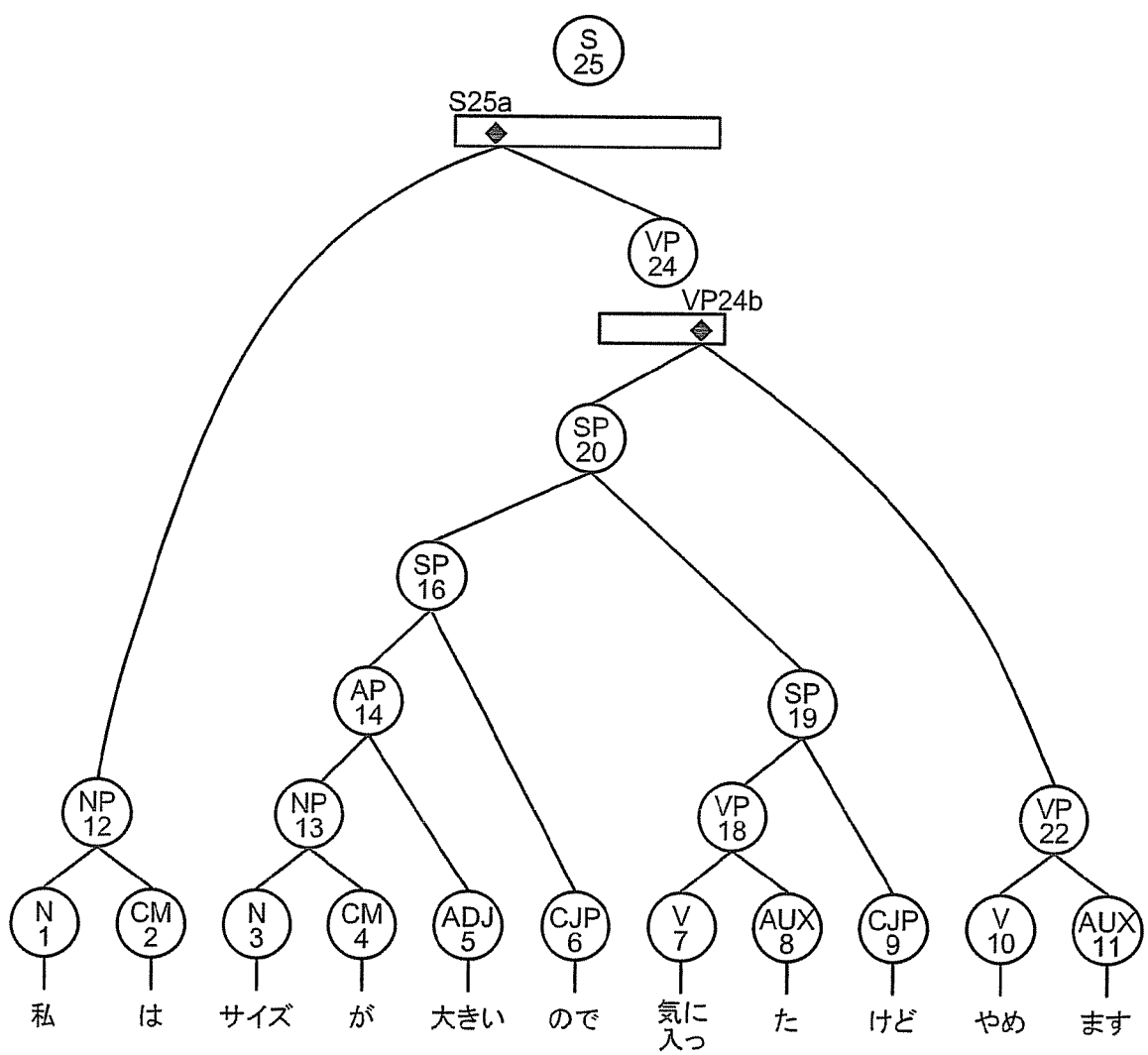
FIG. 7 is a diagram for showing an example of another parse tree in the parse forest of FIG. 5.

In FIG. 5, an example of a parse forest that is obtained as a result of a syntactic analysis executed on the morpheme string 202 of FIG. 2 is illustrated. Among the nodes included in the parse forest structure of FIG. 5, leaf nodes correspond to the morphemes of the morpheme string. The parse forest structure of this drawing is described by packing different parse trees constituted for those morphemes according to the grammatical rules.

As illustrated in FIG. 5, each node of the parse forest is associated with a grammatical category that is derived from the grammatical rules of FIG. 4. For ease of the explanation, an identifier is also attached to each node to distinguish from one another. In the following explanation, a combination of the grammatical category and the identifier of a node, for example, node S24, is used to distinguish the node from others.

As mentioned earlier, a parse forest is a data structure in which multiple parse trees that are plausible for a certain source language sentence in light of the grammatical rules are held in an efficient manner. For example, the parse forest of FIG. 5 encompasses five parse trees that are illustrated in FIGS. 6 to 10.

In the parse forest, if some of the parse trees partially have the same structure (subtree), this portion is shared (shared subtree). In FIG. 5, for example, the node AP14 is shared by the nodes AP15 and SP16. This is because the parse tree of FIG. 6 shares a partial structure rooted in the node AP14 with the parse tree of FIG. 8.

In the parse forest of the morpheme string, when the roots of two subtrees or more are associated with the same grammatical category, the roots of these subtrees are merged (local ambiguities are packed), thereby further enhancing the efficiency in data retention. For example, the node SP21 of FIG. 5 has a structure in which the node SP21a having the nodes NP12 and SP20 as child nodes and the node SP21b having the nodes SP17 and SP19 as child nodes are merged. This is because the node SP21 in FIG. 9 and the node SP21 in FIG. 10 correspond to the same morpheme string and the grammatical categories of these nodes are both SP.

The syntax analyzing unit 103 further resolves semantic ambiguities in interpretations of the parse forest and finally outputs the parse forest having only a structure with the highest plausibility (preference) that indicates the certainty of the structure.

Figure 8:
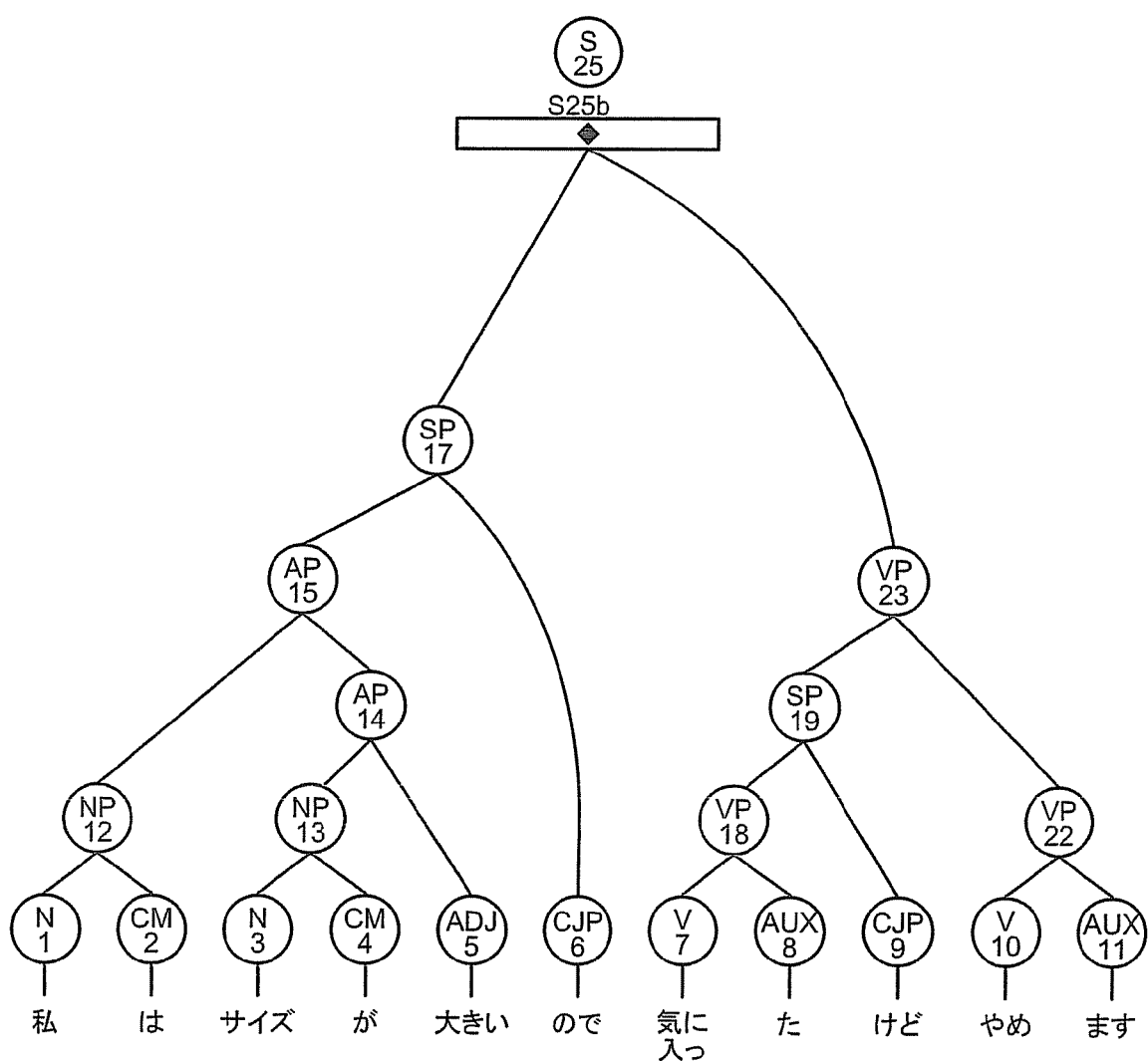
FIG. 8 is a diagram for showing an example of still another parse tree in the parse forest of FIG. 5.
Figure 9:
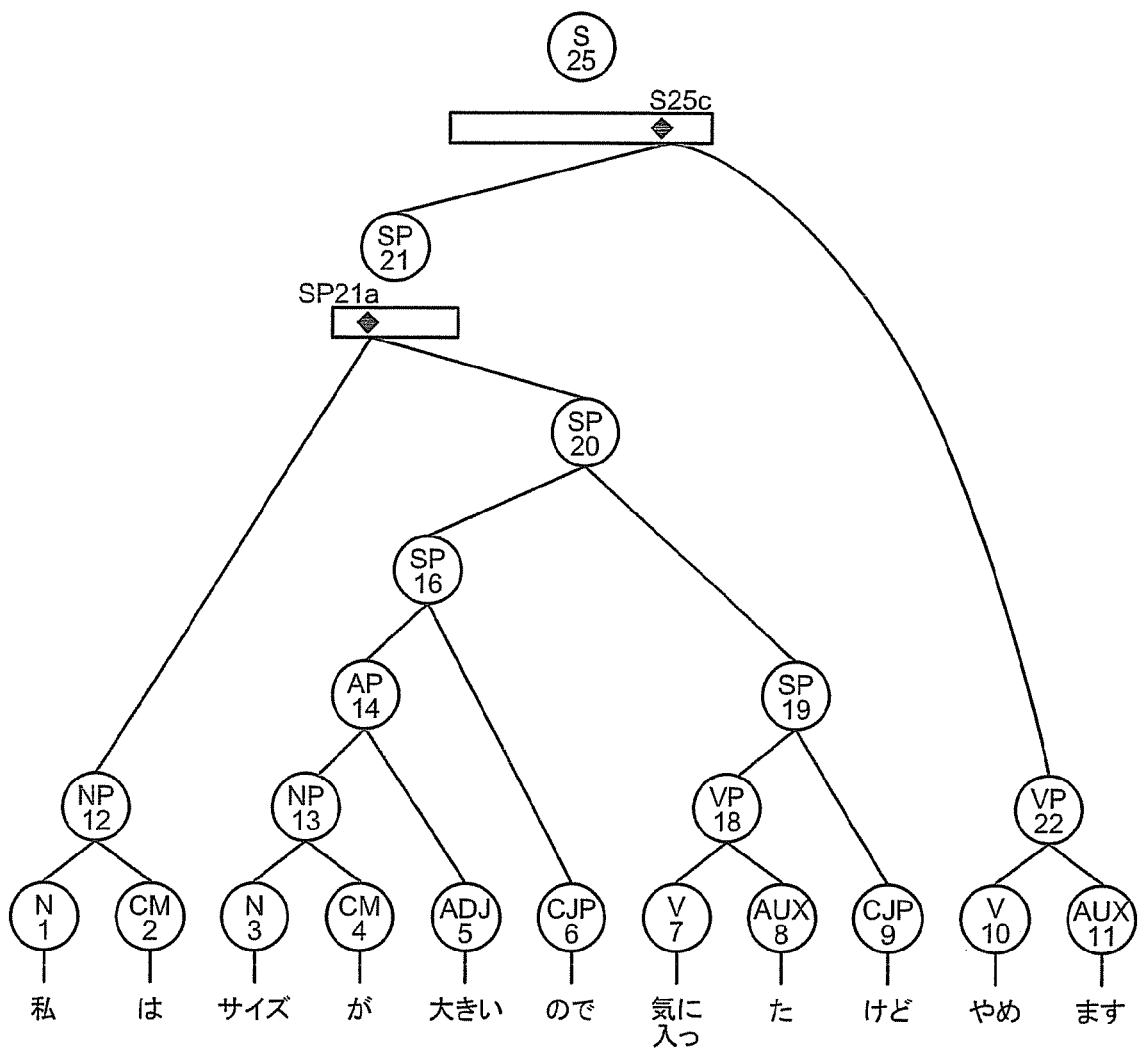
FIG. 9 is a diagram for showing an example of still another parse tree in the parse forest of FIG. 5.
Figure 10:
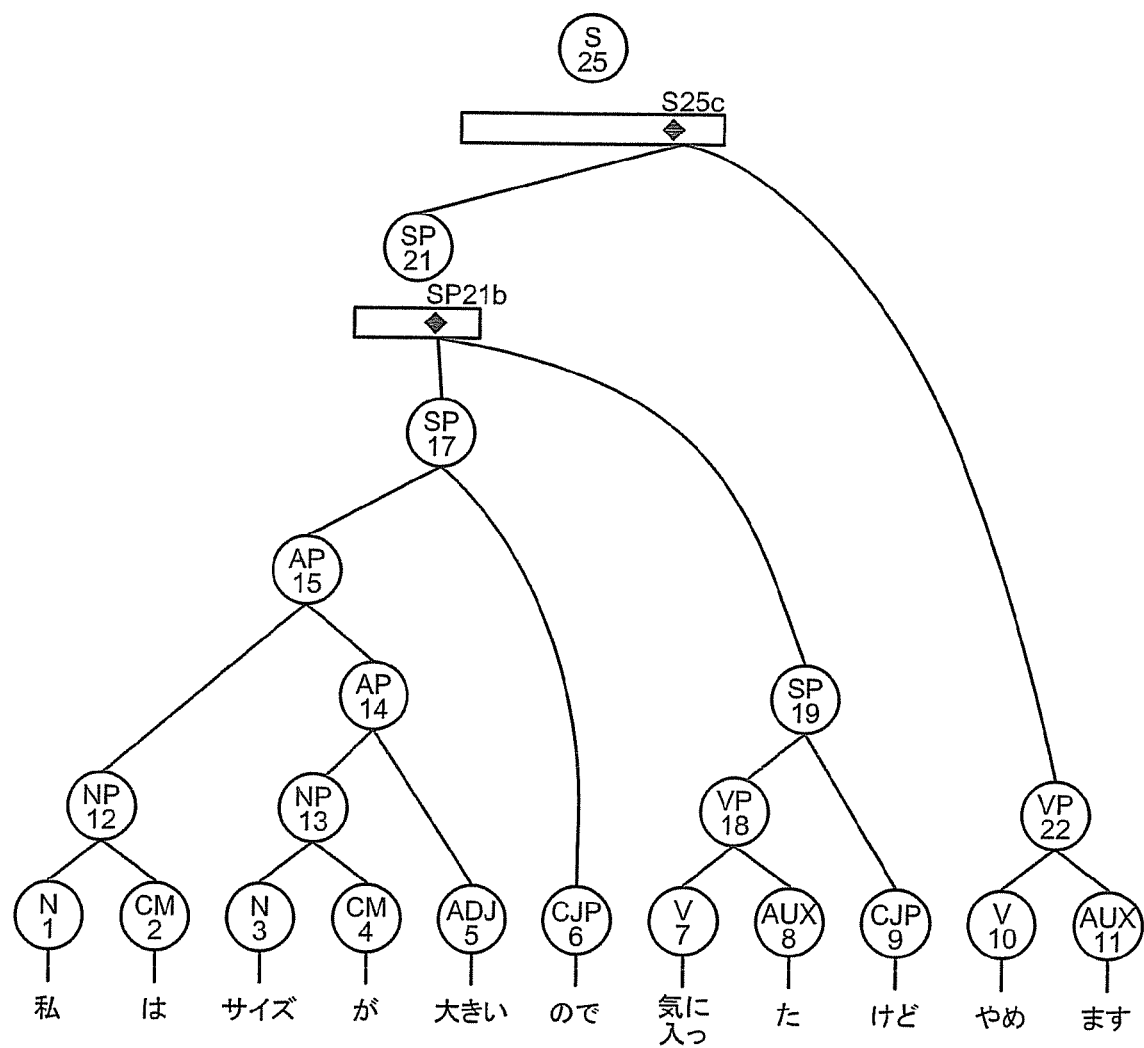
FIG. 10 is a diagram for showing an example of still another parse tree in the parse forest of FIG. 5.
Figure 11:
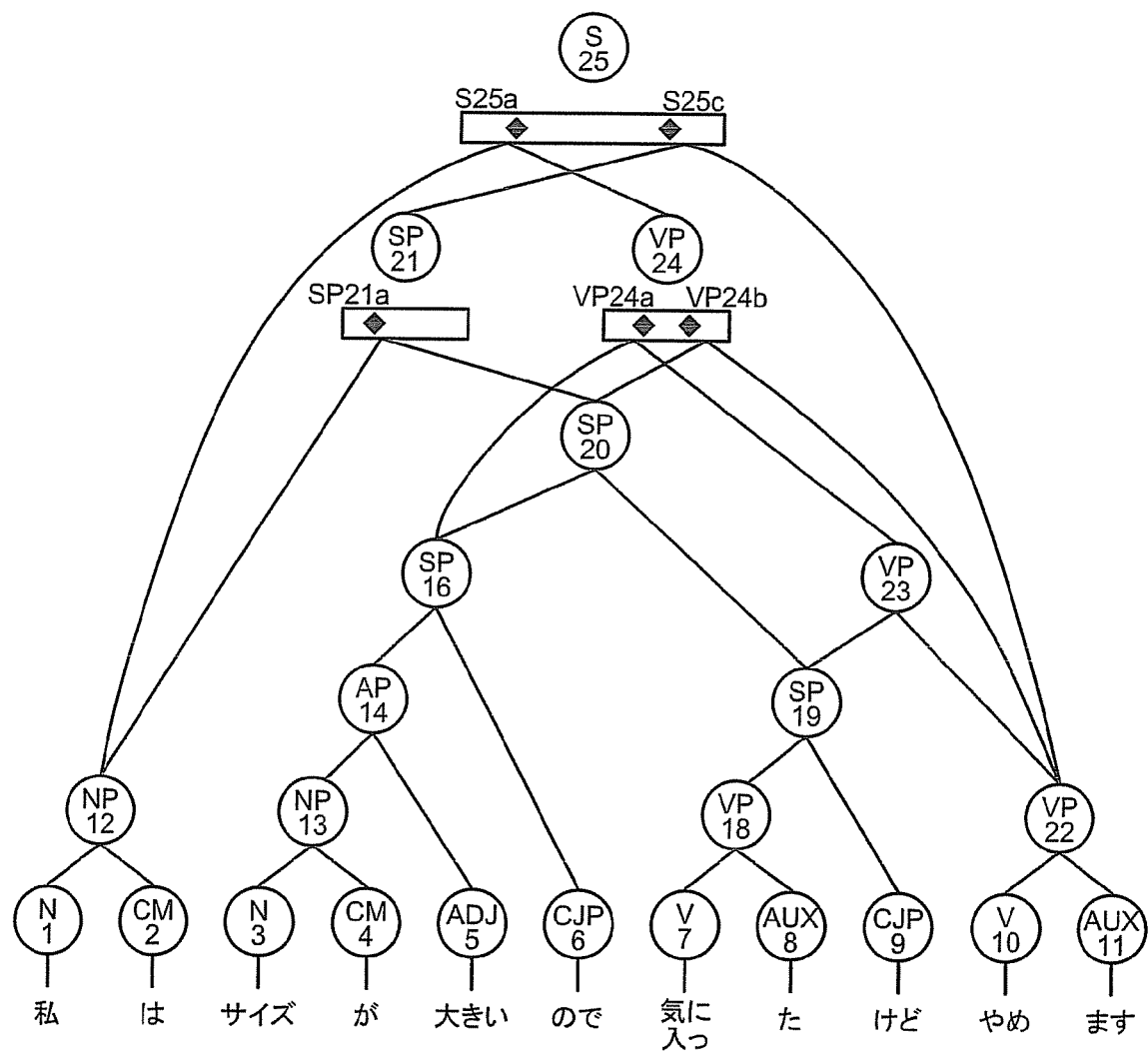
FIG. 11 is a diagram for showing an example of the parse forest from which ambiguity in interpretation is reduced.

For example, the parse tree indicated in FIG. 8 is one of the structural components of the parse forest of FIG. 5, where the structure can be interpreted as "watashi wa saizu ga ookii" (I am size-wise large), indicating that "watashi" (I) modifies "ookii" (large). If, for example, the occurrence of this interpretation is lower than the occurrences of interpretations that "watashi" modifies "kini-it(ta)" and that "watashi" modifies "yame(masu)", the syntax analyzing unit 103 determines that the interpretation of "watashi" modifying "ookii" is inappropriate. The syntax analyzing unit 103 therefore abandons the parse tree of FIG. 8, and holds other parse trees. As a result, the syntax analyzing unit 103 outputs a parse forest as indicated in FIG. 11 in which ambiguities in interpretations are reduced.

There are some conventional methods that can be adopted to determine semantic preferences of the parse trees encompassed by the parse forest and resolve the ambiguities in interpretations. One of the methods is a stochastic free-context grammar with which the probability of the application of each grammatical rule is learned from a massive corpus, and the probability of a parse tree is given as the product of the probabilities of the grammatical rules. A method described in JP-A 2006-53679 (KOKAI) can also be used.

As explained above, the syntax analyzing unit 103 resolves ambiguities in interpretations from a semantic view point for the syntactic structures analyzed in accordance with the grammatical rules by generalized LR parsing. If all the ambiguities in the interpretations are resolved, the syntax analyzing unit 103 outputs a parse tree having a single interpretation. On the other hand, if unresolved ambiguities still remain, the syntax analyzing unit 103 outputs a parse forest encompassing several parse trees.

The syntax analyzing unit 103 may be configured to output a parse forest including all the parse trees obtained in accordance with the grammatical rules, without resolving semantic ambiguities.

In FIG. 1, the extracting unit 104 extracts morphemes that correspond to subtrees having nodes that form the parse forest and serve as the most significant nodes, and thereby generates segmentation information of the segmented source language sentence. More specifically, the extracting unit 104 determines nodes included in the parse forest output by the syntax analyzing unit 103, as to-be-noted nodes (first nodes), and cuts out regions (first partial structures) that the first nodes dominate as their lower structures (subtrees) in the leaf direction. Thus, the first partial structure includes all leaf-ward nodes unified into the first node. Then, the extracting unit 104 identifies a range of the source language sentence that corresponds to each of the cut-out first partial structures, as a first sub-string that represents the partial character string that corresponds to the first partial structure. Thereafter, the extracting unit 104 generates the segmentation information by associating each of the first nodes with the corresponding first sub-string identified from the first node. Hereinafter, the segmentation information generated in this manner is referred to as basic partial information.

When two nodes included in the parse forest output by the syntax analyzing unit 103 make up a combination and a region dominated by one of the nodes encompasses the syntactic structure of the other node, the extracting unit 104 cuts out a difference between the two regions dominated by the two nodes included. The extracting unit 104 identifies the range (morphemes) of the source language sentence that corresponds to the cut-out region as a partial character string. In other words, the extracting unit 104 cuts out, for each of the first nodes, a region (a cut-out region) dominated by a second node positioned lower than the first node in the leaf direction as a lower structure (subtree). Thus, the second node has a direct or indirect grammatical relation to the first node, and is unified into the first node. And, the cut-out region includes all leaf-ward nodes unified into the second node. Then, the extracting unit 104 identifies the range of the source language sentence that corresponds to a second partial structure indicating a difference between the cut-out region and the first partial structure dominated by the first node, as a second sub-string that is a partial character string that corresponds to the second partial structure.

In the following description, a node that dominates a structure encompassing another structure is referred to as a parent node, while a node that dominates the encompassed structure is referred to as a child node. The extracting unit 104 generates segmentation information in which the parent node, the child node, and the region of the source language sentence (second sub-string) corresponding to the cut-out second partial structure are associated with one another. Hereinafter, the segmentation information generated in this manner is referred to as differential partial information.

The device may have a structure in which the extraction of the basic partial information and the extraction of the differential partial information may be executed by different units (for example, a first extracting unit and a second extracting unit).

Figures 12, 13:
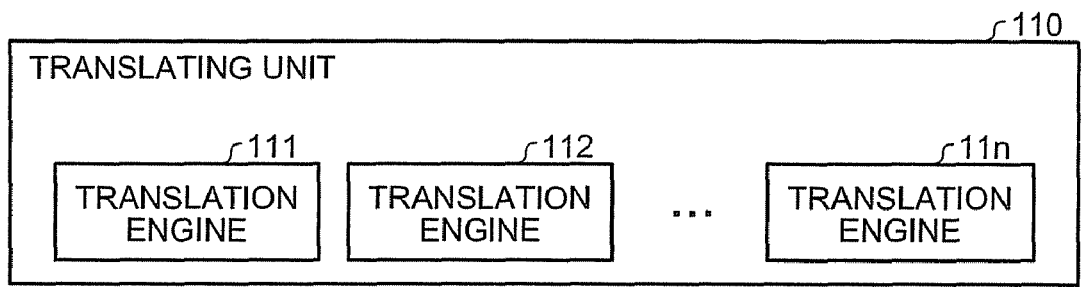
FIG. 12 is a diagram for showing an example data structure of segmentation information output by an extracting unit.
FIG. 13 is a block diagram for showing an example structure of a translating unit in detail.

FIG. 12 is a diagram for showing an example data structure of the segmentation information (the basic partial information and the differential partial information) output by the extracting unit 104. As shown in the top of the drawing, the basic partial information is described in the form of "(the grammatical category and the identifier of a node), (the corresponding partial character string)".

In FIG. 5, for example, the node AP15 dominates a lower structure containing the nodes NP12, N1, CM2, AP14, NP13, N3, CM4, and ADJ5. The node AP15 corresponds to a character string "watashi wa saizu ga ookii" (I am large size-wise) of the source language sentence. Thus, the extracting unit 104 generates basic partial information 1201 (AP15, watashi wa saizu ga ookii) as indicated in FIG. 12, in relation to the node AP15.

Moreover, as indicated at the bottom of FIG. 12, the differential partial information is described in the form of "(the grammatical category and the identifier of a parent node), (the grammatical category and the identifier of a child node), (the corresponding partial character string)".

For example, differential partial information generated for the combination of the nodes S25a and SP16 of FIG. 5 is considered. The node S25a dominates the lower structure containing the nodes NP12, N1, CM2, VP24 (packed local ambiguity nodes VP24a and VP24b), SP16, CJP6, AP14, NP13, N3, CM4, ADJ5, SP20, SP19, VP18, V7, AUX8, CJP9, VP23, VP22, V10, and AUX11. In other words, the node S25a dominates a region 501 of FIG. 5.

Similarly, the node SP16 dominates a lower structure containing the nodes CJP6, AP14, NP13, N3, CM4, and ADJ5. In other words, the node SP16 dominates a region 502 of FIG. 5.

This means that the node S25a completely encompasses the region dominated by the node SP16. Then, the node S25a becomes a parent node, and the node SP16 becomes a child node.

Then, the extracting unit 104 cuts out a region 503 of FIG. 5, which is a difference between the regions dominated by the node S25a and by the node SP16. The region 503 contains the nodes NP12, N1, CM2, VP24 (the packed local ambiguity nodes VP24a and VP24b), SP20, SP19, VP18, V7, AUX8, CJP9, VP23, VP22, V10, and AUX11. Then, the extracting unit 104 identifies the range of the input sentence that corresponds to the region 503.

As a result, the extracting unit 104 generates differential partial information 1202 (S25a, SP16, "watashi wa kiniitta kedo yamemasu" (I like it, but I won't take it)) in FIG. 12 for the combination of the nodes S25a and SP16.

In this manner, the extracting unit 104 generates two types of segmentation information, basic partial information and differential partial information, for all the nodes and all the combinations of two nodes. Thereafter, the extracting unit 104 outputs a set of the segmentation information that is generated.

Instead of generating the segmentation information for every node and every combination of two nodes, the extracting unit 104 may be configured to restrict the grammatical categories of nodes that are to be extracted. In FIG. 4, for example, regions that correspond to phrases only such as noun phrases and verb phrases are cut out. Therefore, the grammatical categories of nodes that are to be cut out may be restricted to S (sentence), SP (subordinate phrase), VP (verb phrase), NP (noun phrase), and AP (adjective phrase). The segmentation size of the source language sentence can be thereby controlled.

Moreover, the occurrence probability of the partial character string included in the segmentation information generated by the extracting unit 104 may be calculated based on the corpus so that segmentation information including a partial character string of a probability lower than a predetermined value can be deleted. Then, the segmentation is prevented from becoming unnatural. Furthermore, the structure may be that only parse trees with high preferences from among the parse forest are subjected to the segmenting process so that the processing amount can be reduced.

In FIG. 1, the translating unit 110 translates a given character string of the source language to the target language in each of the predetermined translation systems, and generates partial translation information that includes a translation result and a translation score. As illustrated in FIG. 13, the translating unit 110 includes translation engines 111 to 11n that realize different translation systems.

The translation engines 111 to 11n translate a given character string in a system predetermined from among commonly used machine translation systems, such as rule-based, example-based, and statistics-based systems. The translating unit 110 distributes the input character string to each of the translation engines 111 to 11n. The translating unit 110 also outputs character strings translated by the translation engines 111 to 11n and the calculated translation scores.

For example, with an example-based translation system, the similarity between the character string and the example may be adopted as a translation score. With a statistics-based translation system, the probability of the translation based on a language model may be adopted as a translation score. With a rule-based translation system, the plausibility of the syntax and the preference of the rule that is applied may be based on to obtain a translation score. In other words, a translation score can be calculated by a calculation method predetermined for each of the translation systems. However, the calculation methods do not always need to be individually determined for different systems to obtain the translation score. For example, the occurrence probability of each translation character string output by a translation system may be calculated based on a common language model (corpus) and adopted as a translation score. Otherwise, a translation probability may be calculated for a combination of a translation character string output by each of the translation systems and the source language sentence, based on a translation model learned in advance from a parallel translation corpus or the like, and adopted as a translation score.

The translating unit 110 generates partial translation information and stores it in the partial translation storage unit 123. In the partial translation information, the segmentation information generated by the extracting unit 104, a partial translation obtained as a result of translating the partial character string included in the segmentation information, the translation score output together with the partial translation, information of the nodes included in the original segmentation information, and an identifier that identifies the translation system that is used for the translation are associated with one another.

Because the segmentation information includes basic partial information and differential partial information, the translating unit 110 generates two types of partial translation information in correspondence with the types of segmentation information.

The basic partial information includes nodes that are referred to when cutting out the partial structure and a partial character string that corresponds to the cut-out partial structure. Thus, the translating unit 110 generates partial translation information in which the nodes, the partial character string, the partial translation of the partial character string obtained by the translating unit 110, and the translation score output together with the partial translation are associated with one another. In the following explanation, the partial translation information generated from the basic partial information in this manner is referred to as partial translation basic information.

On the other hand, the differential partial information includes the parent node and the child node that are referred to when cutting out the partial structure, and a partial character string that corresponds to the cut-out partial structure. Thus, the translating unit 110 generates partial translation information in which the parent node, the child node, the partial character string, the partial translation of the partial character string obtained by the translating unit 110, and the translation score output together with the partial translation are associated with one another. Hereinafter, the partial translation information generated from the differential partial information is referred to as partial translation difference information.

In FIG. 1, the partial translation storage unit 123 stores therein the partial translation information generated by the translating unit 110. The partial translation information is explained in detail below.

As indicated in FIG. 14, the partial translation information includes a node (parent), which is either a node included in the basic partial information or a parent node included in the differential partial information; a node (child), which is a child node included in the differential partial information; a partial character string included in the basic partial information or the differential partial information; a partial translation; a translation score; and an identifier that identifies the translation system.

For the partial translation basic information, the "node (child)" cell is always left blank. The partial translation indicates the result of translating the cut-out partial character string. The identifier is included for the sake of convenience as a supplemental element to show that the translation is obtained by use of one of multiple translation systems. The presence/absence of the identifier does not have any effect on the operation of the machine translating apparatus 100 according to the present embodiment.

In FIG. 14, partial translation basic information 1401 is an example of the partial translation basic information. The partial translation basic information 1401 indicates that when the basic partial information is cut out with reference to the node S25a and translated with a translation system 1 (for example, a translation engine 111), a partial translation "Since I am large size, although it is pleased, I stop." is obtained at a translation score 0.6.

Partial translation basic information 1402 is another example of the partial translation basic information. In the same manner as the partial translation basic information 1401, the partial translation basic information 1402 shows the result of translating the basic partial information cut out with respect to the node S25*a*. However, no partial translation is obtained with a translation system 2 (for example, the translation engine 112), with a translation score being 0. This can be a situation in which the translation system 2 is example-based, and no similar example is found.

Partial translation difference information 1405 of FIG. 14 is an example of the partial translation difference information. The partial translation difference information 1405 shows that as a result of translating with the translation system 2 (for example, the translation engine 112) the differential partial information that is cut out by referring to the node S25*a* and eliminating the structure under the node SP16, a partial translation "Although I love it, I give it up." is obtained at a translation score 0.5.

In FIG. 1, the most-plausible structure selecting unit 105 checks all the possible combinations of the items of the partial translation information stored in the partial translation storage unit 123 to find a specific combination: The nodes included in the partial translation information are on the same parse tree; the partial character strings of the partial translation information are sufficient enough to cover the entire source language sentence without overlapping one another; and the probability of the combination has the greatest value among all the possible combinations, or in other words, the total translation score that is the translation score of the entire sentence generated from the combined partial translation information has the highest value. Then, the most-plausible structure selecting unit 105 outputs a set of the most plausible partial translation information that contains the partial translation structures included in the selected combination.

For example, the most-plausible structure selecting unit 105 generates, from among the items of the partial translation information, all the possible combinations of the items in which the nodes included in the partial translation information are on the same parse tree and the partial character strings of the partial translation information are sufficient enough to cover the entire source language sentence. Then, the most-plausible structure selecting unit 105 calculates the total translation score for each of the generated combinations, and selects a combination with the highest total translation score. The most-plausible structure selecting unit 105 may be configured to select the set of the most plausible partial translation information by use of dynamic programming or the like so that all combinations do not have to be generated.

As the total translation score, the most-plausible structure selecting unit 105 uses the average of the translation scores included in the partial translation information. The calculation of the total translation score is not limited to this method, however. The total translation score may be calculated in consideration of the probabilities of the subtrees, or any other method may be adopted. For example, as the probability of the subtree of the parse forest that corresponds to the segmentation information based on which each item of the partial translation information is generated, the most-plausible structure selecting unit 105 may be configured to calculate the probabilities of the generation of the syntactic structures in accordance with stochastic context-free grammar, and incorporate the average of the translation scores obtained by multiplying these probabilities as the total translation score.

In FIG. 14, partial translation difference information 1406 shows partial translation information obtained from the basic partial information, which is obtained with reference to the node S25*a*. On the other hand, the node S25*a* dominates the entire source language sentence. Thus, to translate the character string corresponding to this node means to translate the entire source language sentence. In other words, the partial translation of the partial translation difference information 1406 represents the result of translating the entire source language sentence with the translation system 1 (for example, the translation engine 111).

The partial translation information that includes partial translations obtained by translating the basic partial information cut out with respect to the node dominating the entire source language sentence with different translation systems contains the best translation result that can be achieved for the entire source language sentence from each of the translation systems and the translation score (global translation score) of this result. For this reason, a combination that has the average of the translation scores greater than the global translation score should be found from among the combinations of the translation results obtained with all the translation engines included in the translating unit 110. The translation result for the entire source language sentence can be thereby improved in its quality.

In FIG. 1, the generating unit 106 generates a sentence in the target language, which is the result of translating the entire source language sentence, based on the set of the most plausible partial translation information output by the most-plausible structure selecting unit 105 and the parse forest output by the syntax analyzing unit 103.

When the partial translation information in the set of the most plausible partial translation information has a partial translation difference structure, the generating unit 106 eliminates, from the regions dominated by the parent node of the partial translation information in the leaf direction, a region dominated by the child node of the partial translation information in the leaf direction, and replaces a morpheme string corresponding to the remaining region with the partial translation included in the partial translation information. Then, the generating unit 106 eliminates any nodes that dominate only the region of the replaced morpheme string from the parse forest so that the partial translation becomes a region directly dominated by the parent node included in the partial translation information. When the parent node dominates other nodes, morphemes that correspond to those nodes and the partial translation should be rearranged into an appropriate order. The generating unit 106 therefore rearranges the nodes directly dominated by the parent node with reference to a morpheme positioned the closest in the eliminated morpheme string to the end of the source language sentence, in the order of the morpheme strings corresponding to the regions dominated by the other nodes.

When the partial translation information included in the set of the most plausible partial translation information has a partial translation basic structure, the generating unit 106 replaces a morpheme string corresponding to the region dominated by the node of the partial translation information in the leaf direction with the partial translation of the partial translation information. Then, the generating unit 106 eliminates from the parse forest a node that includes the replaced morpheme string in its dominating region but does not include the node included in the partial translation information in the dominating region so that partial translation becomes a region directly dominated by the node of the partial translation information.

In this manner, the generating unit 106 embeds the partial translation information in the parse forest, and thereby outputs the translation results of the partial character strings of the source language sentence obtained by appropriate translation systems, in the form of a parse tree maintaining the syntactic and semantic relationship. Then, the generating unit 106 connects the leaf nodes of the output parse tree from left to right, thereby generating a target language sentence.

The generating unit 106 may be configured to adopt a higher-order translation generating method. For example, a rule-based translation system may be re-applied to the translation result output in the parse-tree form so that adjustments can be made to the target language sentence.

The output unit 107 outputs the target language sentence generated by the generating unit 106. The outputting method adopted by the output unit 107 can be realized by any conventional system, such as an image output onto a display device, printing by a printer, and voice synthesized by a speech synthesizer. Those systems may be switched around depending on the needs, or multiple systems may be adopted at the same time.

Figure 15:
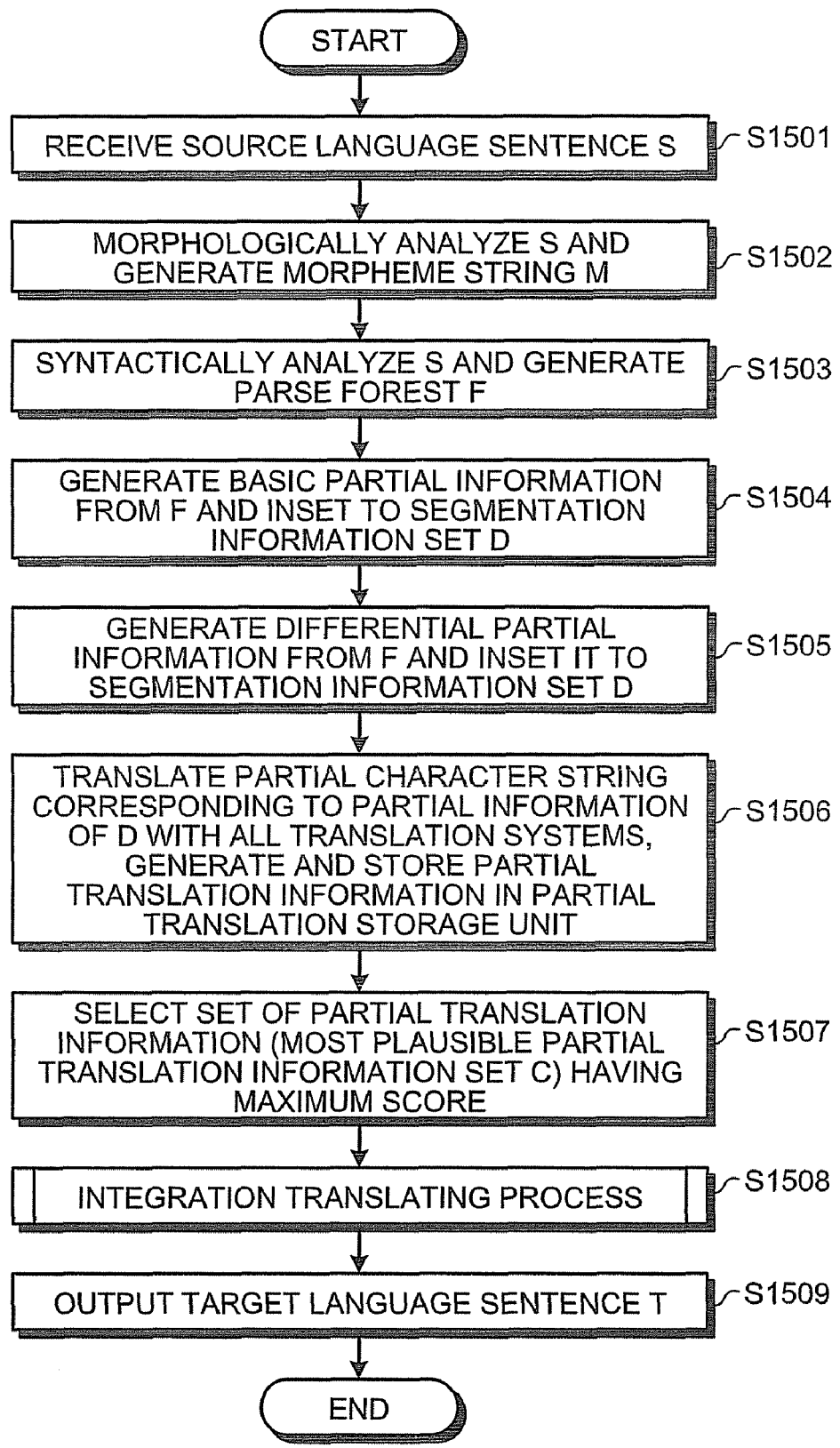
FIG. 15 is a flowchart of the entire machine translation process according to an embodiment.

The translating process conducted by the machine translating apparatus 100 according to the present embodiment is explained below with reference to FIG. 15.

First, the input unit 101 receives a source language sentence S (Step S1501). Next, the morpheme analyzing unit 102 conducts a morphological analysis on the source language sentence S and generates a morpheme string M (Step S1502). Then, the syntax analyzing unit 103 conducts a syntactic analysis on the morpheme string M, and generates a parse forest F (Step S1503).

Thereafter, the extracting unit 104 generates the basic partial information from the parse forest F, and adds it to a segmentation information set D (Step S1504). The extracting unit 104 also generates the differential partial information from the parse forest F, and adds it to the segmentation information set D (Step S1505).

Next, the translating unit 110 translates partial character strings corresponding to the items of the partial information in the segmentation information set D with all the translation engines 111 to 11n included in the translating unit 110, generates the partial translation information that contains the translation results, and stores it in the partial translation storage unit 123 (Step S1506).

Then, the most-plausible structure selecting unit 105 selects a most plausible partial translation information set C from among all the possible combinations of the items of the stored partial translation information (Step S1507). The most plausible partial translation information set C has to be a combination of the items of the stored partial translation information whose nodes are on the same parse tree, whose partial character strings are sufficient enough to constitute the entire source language sentence, and whose total translation score takes the greatest value.

Thereafter, the generating unit 106 executes an integration translating process to generate a target language sentence T from the selected most plausible partial translation information set C (Step S1508). The details of the integration translating process will be given later. Finally, the output unit 107 outputs the generated target language sentence T (Step S1509), and terminates the translating process.

Figure 16:
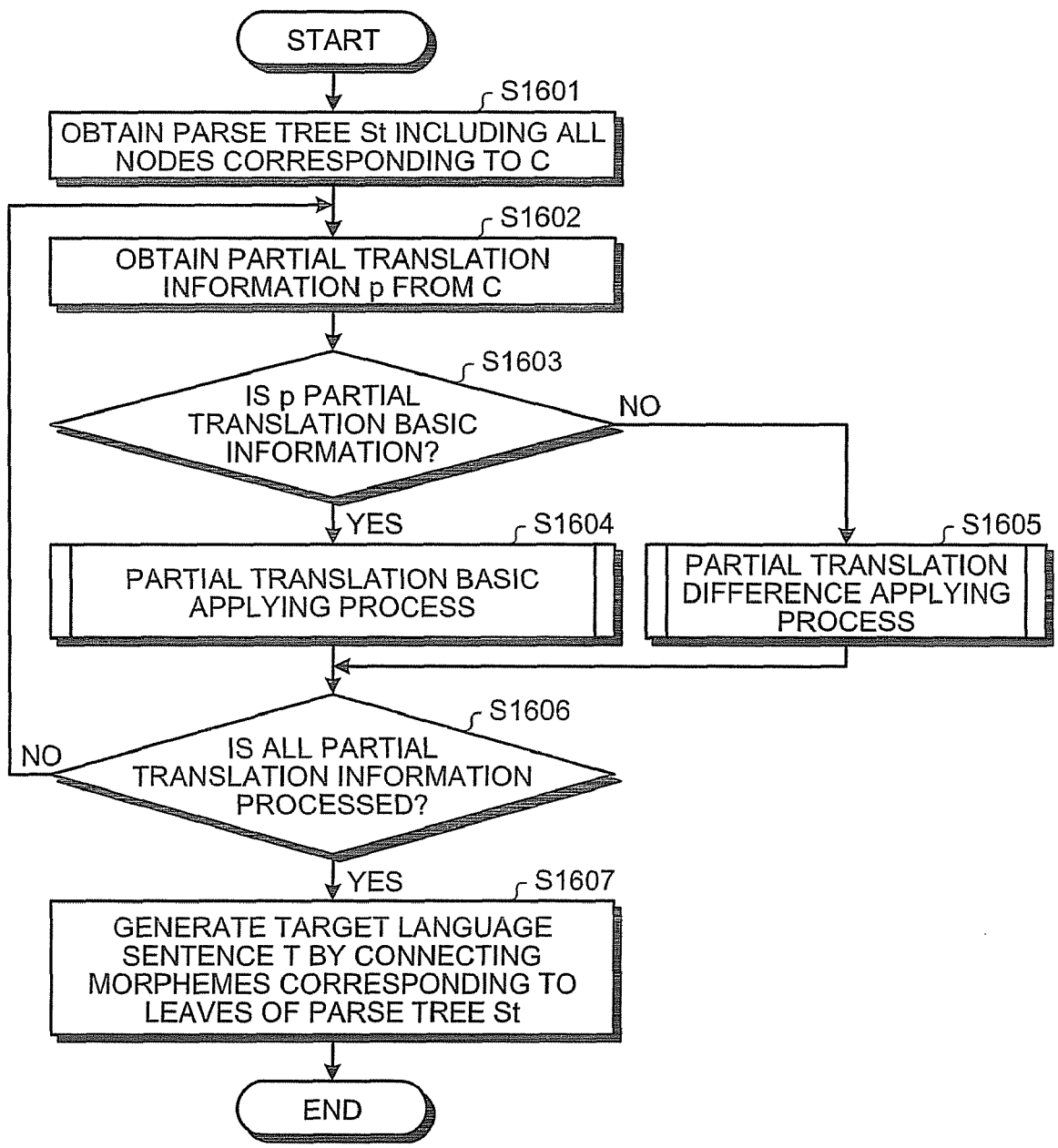
FIG. 16 is a flowchart of an integration translating process according to the embodiment.
Figure 17:
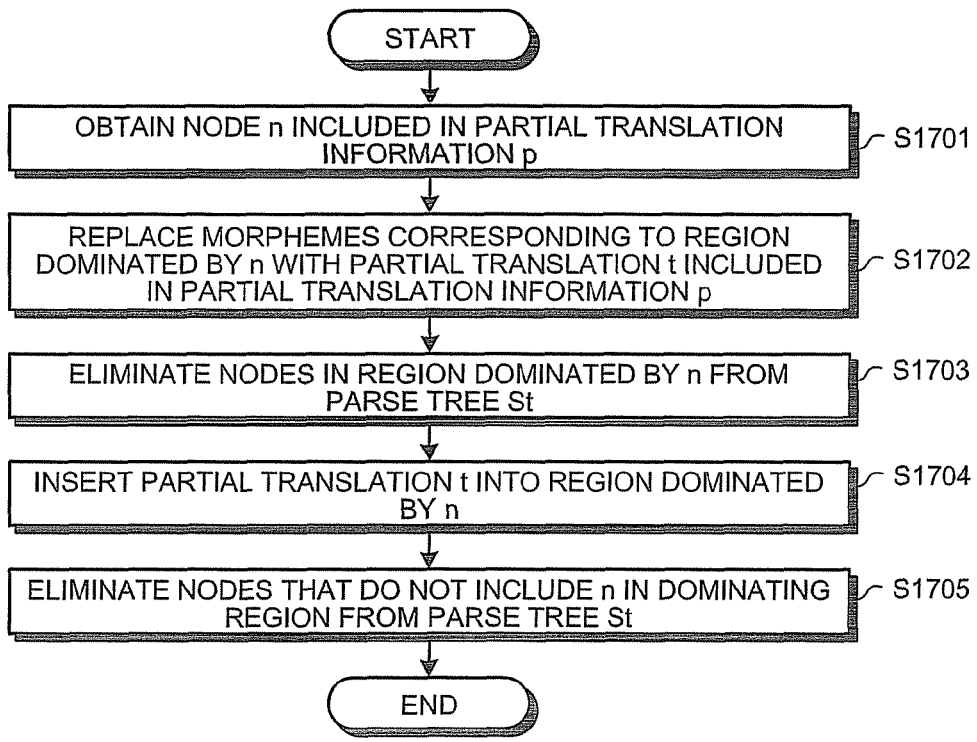
FIG. 17 is a flowchart of a basic partial translation adopting process according to the embodiment.
Figure 18:
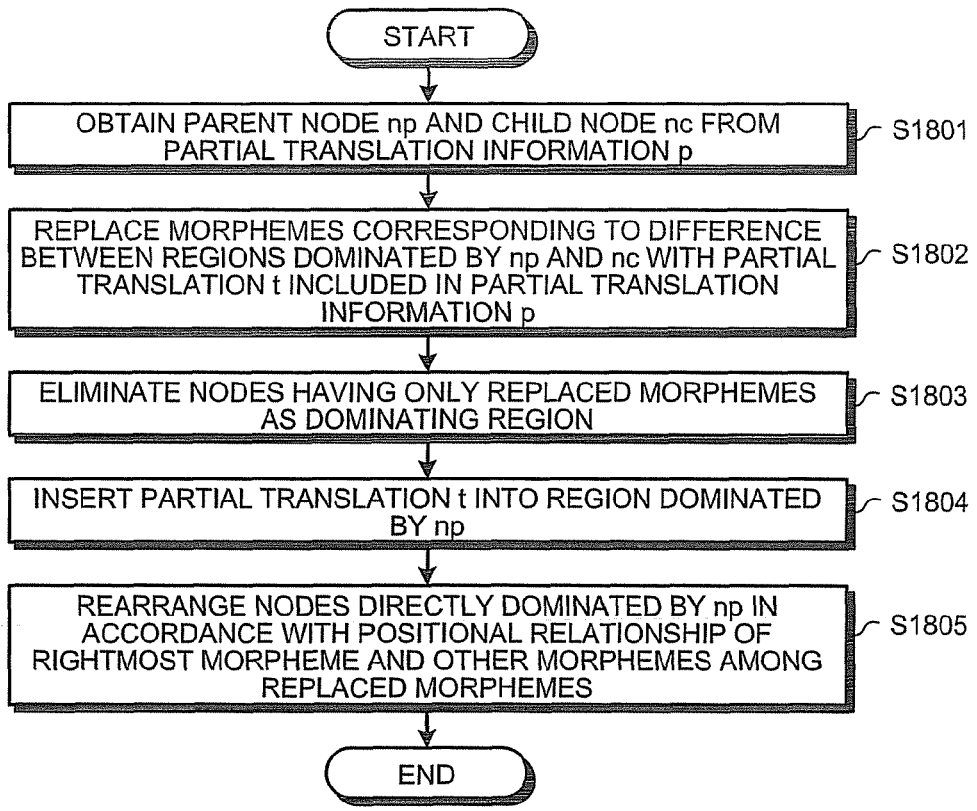
FIG. 18 is a flowchart of a partial translation difference adopting process according to the embodiment.

Next, the integration translating process at Step S1508 is explained below in detail with reference to FIGS. 16 to 18.

First, the generating unit 106 extracts from the parse forest F a parse tree that has all the nodes of the partial translation information included in the most plausible partial translation information set C, and determines it as a parse tree St (Step S1601). Because of the nature of the most plausible partial translation information set C, the extracted parse tree St is always determined to be a single parse tree that indicates an interpretation of the entire source language sentence. Next, unprocessed partial translation information p is acquired from the most plausible partial translation information set C (Step S1602). The generating unit 106 determines whether this partial translation information p is an item of the partial translation basic information (Step S1603). When the partial translation information p is an item of the partial translation basic information (Yes at Step S1603), the generating unit 106 executes a partial translation basic applying process to apply the partial translation basic information to the parse tree St (Step S1604). The details of the partial translation basic applying process will be given later.

When the partial translation information p is not an item of the partial translation basic information, or in other words, when the partial translation information p is an item of the partial translation difference information (No at Step S1603), the generating unit 106 executes a partial translation difference applying process to apply the partial translation difference information to the parse tree St (Step S1605). The details of the partial translation difference applying process will be given later.

Then, the generating unit 106 determines whether all the items of the partial translation information in the most plausible partial translation information set C have been processed (Step S1606). If there is any unprocessed information item (No at Step S1606), the next item of the partial translation information p is retrieved, and the process is repeated (Step S1602).

When all the items of the partial translation information have been processed (Yes at Step S1606), the generating unit 106 generates the target language sentence T by connecting the morphemes that correspond to the leaves of the finally obtained parse tree St together (Step S1607). Then, the integration translating process is terminated.

Next, the partial translation basic applying process conducted at Step S1604 is explained in detail below with reference to FIG. 17.

First, the generating unit 106 obtains a node n from the partial translation information p (Step S1701). More specifically, the generating unit 106 obtains the node n from the "node (parent)" cell of the partial translation information p. Next, the generating unit 106 replaces the morphemes in the region dominated by the node n with a partial translation t included in the partial translation information p (Step S1702). Then, the generating unit 106 eliminates the nodes in the region dominated by the node n from the parse tree St (Step S1703). Thereafter, the generating unit 106 inserts the partial translation t into the area dominated by the node n (Step S1704). Finally, the generating unit 106 eliminates from the parse tree St any nodes that do not include the node n in their regions (Step S1705), and the partial translation basic applying process is terminated.

The partial translation difference applying process conducted at Step S1605 is explained in detail below with reference to FIG. 18.

First, the generating unit 106 obtains a parent node np and a child node nc included in the partial translation information p (Step S1801). More specifically, the generating unit 106 obtains the parent node np from the "node (parent)" cell of the partial translation information p, and the node nc from the "node (child)" cell. Then, the generating unit 106 replaces morphemes corresponding to a difference between the regions dominated by the parent node np and the child node nc, with the partial translation t included in the partial translation information p (Step S1802). Thereafter, the generating unit 106 eliminates from the parse tree St any nodes dominating a region that includes those replaced morphemes only (Step S1803). The generating unit 106 inserts the partial translation t into the region dominated by the parent node np (Step S1804). Then, the generating unit 106 rearranges the nodes directly dominated by the parent node np in accordance with the positional relationship between the rightmost one of the replaced morphemes and the remaining morphemes (Step S1805). The partial translation difference applying process is thereby terminated.

Figure 19:
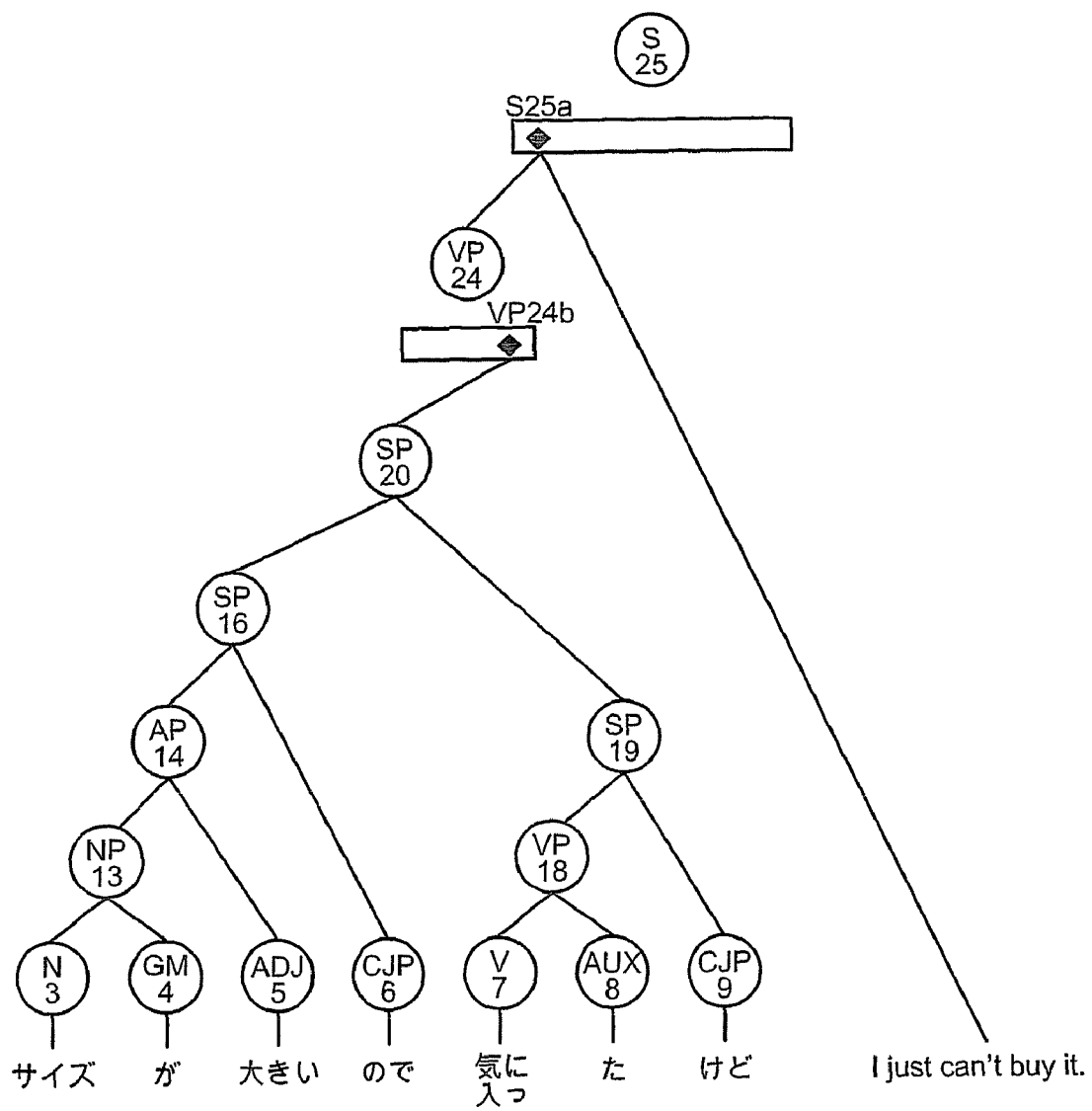
FIG. 19 is a diagram for showing an example of a parse forest generated in the course of the machine translation process.

Next, the machine-translating process according to an embodiment of the present invention is explained in detail below with reference to FIGS. 19 to 21. In the following explanation, it is assumed that the translating unit 110 is provided with two translation systems, the identifiers of which are "1" and "2".

It is assumed that the Japanese source language sentence 201 as indicated in FIG. 2 is input (Step S1501). The morpheme analyzing unit 102 performs a morphological analysis onto the input source language sentence 201, and acquires, for example, the morpheme string 202 of the drawing as a morpheme string M (Step S1502).

The syntax analyzing unit 103 executes generalized LR parsing on the morpheme string M by use of the vocabulary dictionary as shown in FIG. 3, and the grammatical rules as shown in FIG. 4, thereby generating the parse forest as shown in FIG. 5. It is assumed here that the syntax analyzing unit 103 further solves semantic ambiguities in the interpretation, and outputs a parse forest F as shown in FIG. 11, which maintains high-preference structures only (Step S1503).

The extracting unit 104 extracts the basic partial information and the differential partial information from the parse forest F, and outputs, for example, segmentation information D as indicated in FIG. 12 (steps S1504 and S1505). Then, the translating unit 110 translates the partial character strings in all the items of the segmentation information of the segmentation information set D with all the translation systems. The translating unit 110 combines the translation results and the translation scores with the original segmentation information and sequentially generates items of partial translation information. The translating unit 110 then stores the partial translation information as shown in FIG. 14 in the partial translation storage unit 123 (Step S1506).

A situation in which the most-plausible structure selecting unit 105 selects a combination of partial translation basic information 1403, partial translation basic information 1404, and partial translation difference information 1406 as the most plausible partial translation information set C (Step S1507) is considered below.

For this combination, the average of the translation scores for the items of the partial translation information included in the most plausible partial translation information set C is (0.8+0.4+0.9)/3=0.7. This numerical value is greater than both of the translation score 0.6 for the partial translation basic information 1401 indicating that the entire source language sentence is translated with the translation system 1 and the translation score 0 for the partial translation basic information 1402 indicating the entire source language sentence is translated with the translation system 2. It means that the present embodiment realizes translation with higher accuracy than the conventional technologies of performing translation singly with one of different systems or selecting a translation result with a translation system having a high translation score.

Next, the generating unit 106 executes the integration translating process to generate the final target language sentence based on the parse forest F and the most plausible partial translation information set C (Step S1508).

First, the generating unit 106 extracts from the parse forest F the parse tree St having all the nodes included in the partial translation information that belongs to the most plausible partial translation information set C (Step S1601). This parse tree St corresponds to a parse tree under the node S25a in the parse forest F of FIG. 11. Then, the generating unit 106 obtains, for example, the partial translation difference information 1406 as the partial translation information p from the unprocessed items of the most plausible partial translation information set C, which includes the partial translation basic information 1403, the partial translation basic information 1404, and the partial translation difference information 1406 of FIG. 14, (Step S1602).

Because this partial translation information p is not partial translation basic information (No at Step S1603), the generating unit 106 executes the partial translation difference applying process (Step S1605).

In the partial translation difference applying process, the generating unit 106 obtains the parent node S25a and the child node SP20 included in the partial translation information p, or in other words, the partial translation difference information 1406, as a parent node np and a child node nc (Step S1801).

The morpheme string that corresponds to a difference between the regions under the parent node np and under the child node nc means a morpheme string that corresponds to the partial character string included in the differential partial information 1203 of FIG. 12. For this reason, the morpheme string including the morphemes corresponding to the nodes N1, CM2, V10, and AUX11 is replaced with the partial translation included in the partial translation information p, "I just can't buy it" (Step S1802).

Next, the generating unit 106 searches for any node that dominates only the above morphemes from the parse tree St with reference to the replaced morpheme string. In the parse tree St of the parse forest F of FIG. 11, the nodes N1, CM2, NP12, V10, AUX11, and VP22 satisfy this condition. The generating unit 106 eliminates these nodes from the parse tree St (Step S1803). Furthermore, the generating unit 106 inserts the partial translation t into the region dominated by the parent node np (Step S1804). FIG. 19 is a diagram for showing the parse tree St resulting from the above process.

It should be noted that the parent node np has the node VP24 as a directly dominated node and that the morpheme positioned the rightmost in the region dominated by this node VP24 corresponds to the node CJP9. The morpheme positioned the rightmost in the replaced morpheme string corresponds to the node AUX11. This morpheme is positioned after the morpheme corresponding to the node CJP9 in the order of inputting the source language sentence. Thus, the region inserted at Step S1804 is sorted and placed after the node VP24 (Step S1805). The parse tree St therefore remains unchanged from FIG. 19.

Now that the partial translation difference applying process is completed, the generating unit 106 executes the operation at Step S1606. The most plausible partial translation information set C still has, as unprocessed partial translation information, the partial translation basic information 1403 and the partial translation basic information 1404 of FIG. 14. The generating unit 106 therefore obtains the partial translation basic information 1404, for example, as the next item of the partial translation information p that is to be processed (Step S1602).

Because this partial translation information p is partial translation basic information (Yes at Step S1603), the generating unit 106 executes the partial translation basic applying process (Step S1604).

In the partial translation basic applying process, the generating unit 106 obtains the node S19 included in the partial translation information p, or in other words, the partial translation basic information 1404, as the node n (Step S1701).

The morpheme string corresponding to the region under the node n means a partial character string included in the basic partial information 1204 of FIG. 12. Thus, the morpheme string including the morphemes corresponding to the nodes V7, AUX8, and CJP9 of FIG. 11 is replaced with the partial translation included in the partial translation information p, "I like it, but." (Step S1702).

Thereafter, the generating unit 106 searches for nodes in the region under the node n from the parse tree St. In the parse tree St included in the parse forest F of FIG. 11, the nodes V7, AUX8, CJP9, and VP18 satisfy this condition. The generating unit 106 therefore eliminates these nodes from the parse forest F (Step S1703). The generating unit 106 inserts the partial translation t into the region dominated by the node n (Step S1704). The parse tree St resulting from the process is indicated in FIG. 20.

Figure 20:
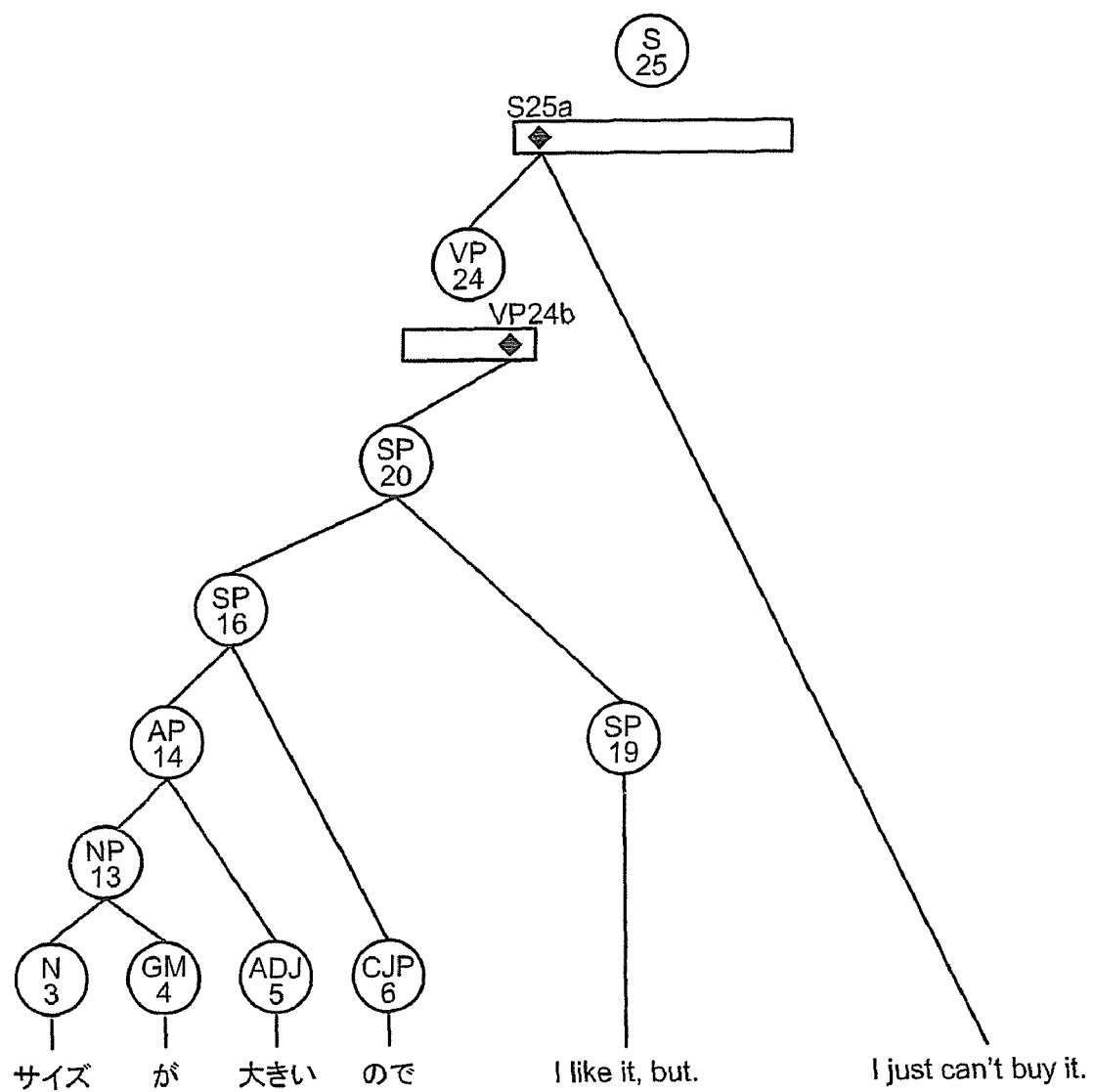
FIG. 20 is a diagram for showing another example of a parse forest generated in the course of the machine translation process.
Figure 21:
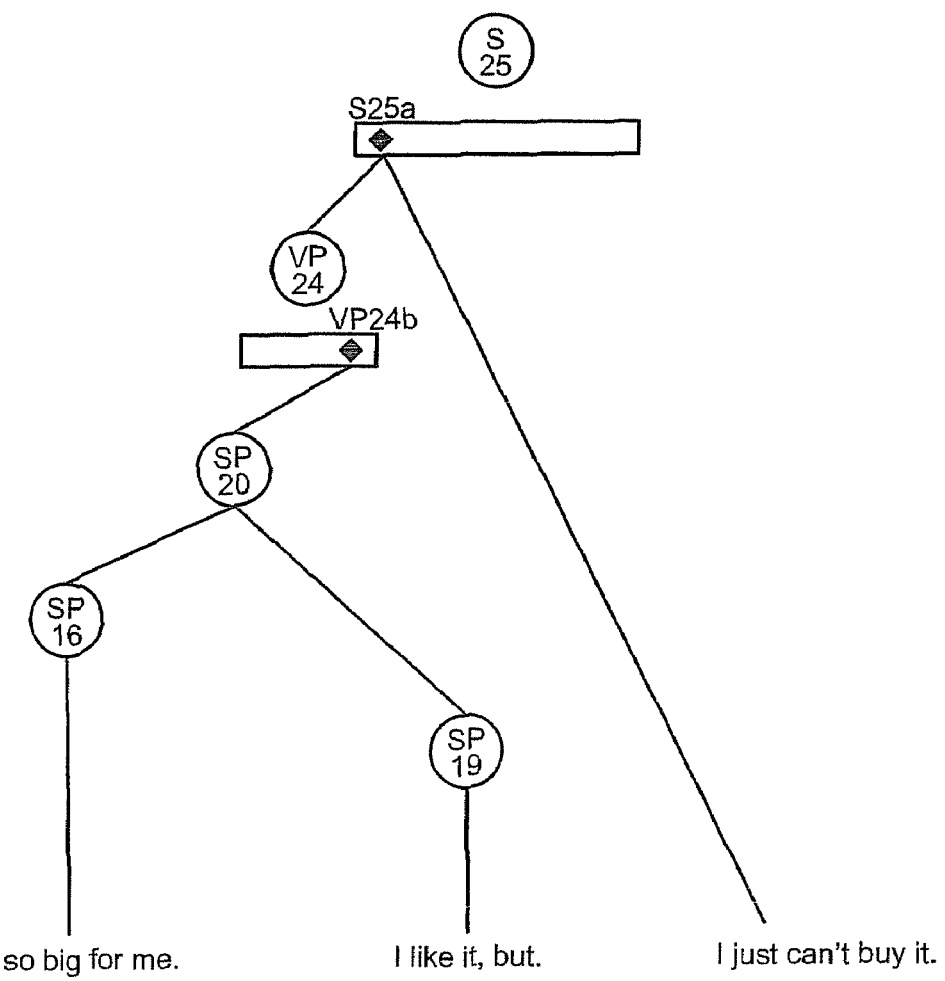
FIG. 21 is a diagram for showing still another example of a parse forest generated in the course of the machine translation process.

In FIG. 20, the parse tree St does not have any structure that does not include the node n, or in other words the node SP19. No node is therefore eliminated at Step S1705.

Now that the partial translation basic applying process is completed, the generating unit 106 executes the operation at Step S1606. Because the most plausible partial translation information set C still includes unprocessed partial translation information, which is the partial translation basic information 1403 of FIG. 14, the generating unit 106 obtains the partial translation basic information 1403 as the next item of the partial translation information p that is to be processed (Step S1602).

Because the partial translation information p is partial translation basic information (Yes at Step S1603), the generating unit 106 executes the partial translation basic applying process (Step S1604).

The partial translation basic applying process performed on the partial translation basic information 1403 is the same as the operation performed on the partial translation basic information 1404. After the partial translation basic applying process is executed on the partial translation basic information 1403, the parse tree St looks like the one in FIG. 21.

All the items of the partial translation information in the most plausible partial translation information set C are now processed (Yes at Step S1606). Thus, the generating unit 106 connects the morphemes corresponding to the leaf nodes of the parse tree St together, and generates a target language sentence T, "It's so big for me, I like it, but I just can't buy it" (Step S1607).

Now that the integration translating process is completed, the output unit 107 outputs the target language sentence T (Step S1509). Then, the machine translating process is terminated.

The translating device according to the present embodiment segments an input source language sentence into partial character strings by use of the syntax information, translates the partial character strings by multiple translation systems, and combines the translation results having the maximum value for the average of the translation scores into a target language sentence. In this manner, even when none of the translation systems can singly produce appropriate translation results for the entire source language sentence, a highly accurate translation can be obtained by translating the segmented partial character strings with the best translation system selected for each of the partial character strings and combining the translation results.

According to the present embodiment, a source language sentence is segmented from the two-dimensional aspect by use of the syntactic structure of the source language sentence, and thus the relationship of the segmented partial character strings can be exploited for the translation. For this reason, in comparison with the one-dimensional segmentation in accordance with the surface pattern of a source language sentence, the translation results can be obtained with high accuracy, and a final target language sentence can be generated with high accuracy.

Furthermore, by executing the integration process based on the syntax information, a target language sentence can be generated with the relationship of the partial translations maintained. This increases the accuracy of the translation result. In addition, because the segmenting process and the translating process are independent from each other, improvements in individual translation systems can directly contribute to improvements in the entire translation quality. Further, a parse forest structure is dealt with at the time of the syntactic analysis. Thus, even when there is more than one parse tree for a source language sentence, or in other words, even when there are multiple syntactic and semantic interpretations for the input source language sentence, the operations can be executed in a concurrent manner. The efficiency and the availability of the machine translating process can be thereby enhanced.

Figure 22:
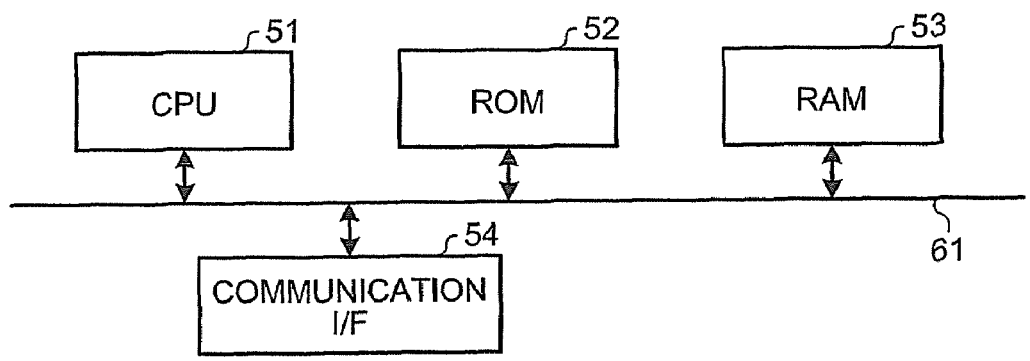
FIG. 22 is a diagram for explaining a hardware structure of the machine translating apparatus according to the embodiment.

Next, the hardware structure of the translating device according to the embodiment is explained with reference to FIG. 22.

The machine translating apparatus according to the embodiment includes a hardware structure using a regular computer, including a control device such as a central processing unit (CPU) 51, memory devices such as a read only memory (ROM) 52 and a RAM 53, a communication interface 54 connected to a network to perform communications, external storage devices such as a hard disk drive (HDD) and a compact disc (CD) drive, a display device, input devices such as a keyboard and a mouse, and a bus 61 connecting these components.

A translating program executed by the translating device according to the embodiment is stored and provided in a computer-readable recording medium such as a compact disk read only memory (CD-ROM), a flexible disk (FD), a compact disk recordable (CD-R), and a digital versatile disk (DVD) in a file of an installable or executable format.

The translating program executed by the translating device according to the embodiment may be stored in a computer connected to a network such as the Internet and downloaded via the network. The translating program executed by the translating device according to the embodiment may be provided or distributed via a network such as the Internet.

The translating program according to the embodiment may be stored in a ROM or the like in advance and provided in this manner.

The translating program executed by the translating device according to the embodiment is given a module structure including the above units (the input unit, the morpheme analyzing unit, the syntax analyzing unit, the extracting unit, the translating unit, the most-plausible structure selecting unit, the generating unit, and the output unit). As an actual hardware structure, the CPU 51 (processor) reads the translating program from the recording medium and executes the program so that the units are loaded and generated on the main storage device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A machine translating apparatus comprising:
an input unit that inputs a source language sentence in a source language;
a morpheme analyzing unit that performs a morphological analysis on the source language sentence and outputs a sequence of morphemes of the source language sentence;
a syntax analyzing unit that performs a syntactic analysis on the morphemes of the source language sentence and outputs a syntactic structure of the source language sentence;
a first extracting unit that extracts from the syntactic structure, if first nodes included in the syntactic structure serve as significant nodes, a first sub-string that corresponds to a first partial structure including all leaf-ward nodes to be unified into each of the first nodes;
a second extracting unit that extracts from the syntactic structure, if second nodes which have a direct or indirect grammatical relation with the first nodes serve as the significant nodes, a second sub-string that corresponds to a second partial structure representing a difference between a partial structure including all leaf-ward nodes to be unified into each of the second nodes and the first partial structure;
a translating unit that translates the first sub-string and the second sub-string into a target language with each of a plurality of translation systems, and generates partial translation information in which translation scores representing translation certainties are associated with respective translation results of the plurality of translation systems;
a selecting unit that selects a combination of selected items from a plurality of combinations of items of the partial translation information, wherein the combination selected meets conditions that the first sub-string and the second sub-string that are originals of the translation results included in the selected items of the partial translation information do not overlap each other, that each of morphemes included in the source language sentence match one of the first sub-string and the second sub-string that are the originals of the translation results included in the partial translation information in the combination, and that a first plausibility calculated based on a subset of the translation scores included in the partial translation information to indicate certainty of the combination takes a largest value;
a generating unit that generates a target language sentence in the target language as a result of translating the source language sentence in a manner that the target language sentence has a subset of the translation results included in the partial translation information in the selected combination;
an output unit that outputs the target language sentence; and
a processor for executing at least the translating unit.

2. The apparatus according to claim 1, wherein the syntactic structure is a parse forest including a plurality of parse trees that are adoptable based on predetermined grammatical rules used for the syntactic analysis of the source language sentence.

3. The apparatus according to claim 2, wherein:
the syntax analyzing unit generates the parse forest that includes the parse trees, wherein the parse trees have respective second plausibilities associated therewith representing certainties of the respective parse trees;
the first extracting unit extracts the first sub-string from a parse tree, of the parse trees, for which a second plausibility is greater than a predetermined first threshold value; and
the second extracting unit extracts the second sub-string from the parse tree for which the second plausibility is greater than the predetermined first threshold value.

4. The apparatus according to claim 1, wherein:
the syntactic structure includes the nodes, wherein the nodes have associated therewith respective grammatical categories of corresponding morphemes; and
the first extracting unit extracts, from the syntactic structure, first sub-strings corresponding to first partial structures in which the first nodes associated with a specific grammatical category of the grammatical categories serve as the significant nodes.

5. The apparatus according to claim 4, wherein:
the first extracting unit further extracts, from among multiple extracted first sub-strings, a first sub-string having a probability of occurrence in a source language corpus larger than a predetermined second threshold value; and
the second extracting unit further extracts, from among multiple extracted second sub-strings, a second sub-string having a probability of occurrence in the source language corpus larger than the predetermined second threshold value.

6. The apparatus according to claim 1, wherein the translating unit generates the translation results with which the translation scores calculated by respective predetermined calculating methods for each of the plurality of translation systems is associated.

7. The apparatus according to claim 1, wherein the translating unit generates the translation results with which the translation scores that are calculated as respective probabilities of occurrence of the translation results in a target language corpus is associated.

8. The apparatus according to claim 1, wherein the translating unit generates the translation results with which the translation scores that are calculated as respective translation probabilities of the translation results based on a predetermined translation model is associated.

9. The apparatus according to claim 1, wherein the selecting unit generates, from among the plurality of combinations, a combination in which morphemes of respective originals of the translation results included in each item of the partial translation information do not overlap one another, each of the morphemes included in the source language sentence corresponds to one of the morphemes of the original of the translation results included in the partial translation information in the combination, calculates the first plausibility for each of the plurality of combinations, and selects a combination that has a maximum value for the first plausibility.

10. The apparatus according to claim 1, wherein the generating unit generates the target language sentence by combining the translation results included in the partial translation information in the combination in accordance with an order of morphemes of the original of the translation results in the source language sentence.

11. A machine translating method comprising:
inputting a source language sentence in a source language;
performing a morphological analysis on the source language sentence and outputting a sequence of morphemes of the source language sentence;

performing a syntactic analysis on the morphemes of the source language sentence and outputting a syntactic structure of the source language sentence;

extracting from the syntactic structure, if first nodes included in the syntactic structure serve as significant nodes, a first sub-string that corresponds to a first partial structure including all leaf-ward nodes to be unified into each of the first nodes;

extracting from the syntactic structure, if second nodes having a direct or indirect grammatical relation with the first nodes serve as the significant nodes, a second sub-string that corresponds to a second partial structure representing a difference between a partial structure including all leaf-ward nodes to be unified into each of the second nodes and the first partial structure;

translating, using a processor, the first sub-string and the second sub-string into a target language with each of a plurality of translation systems, and generating partial translation information in which translation scores representing translation certainties are associated with respective translation results of the plurality of translation systems;

selecting a combination from a plurality of combinations of items of the partial translation information, wherein the combination selected meets conditions that the first sub-string and the second sub-string that are originals of translation results included in items of the partial translation information do not overlap each other, that each of morphemes included in the source language sentence match one of the first sub-string and the second sub-string that are the originals of the translation results included in the partial translation information in the combination, and that a first plausibility calculated based on a subset of the translation scores included in the partial translation information to indicate certainty of the combination has a largest value;

generating a target language sentence in the target language as a result of translating the source language sentence in a manner that the target language sentence has a subset of the translation results included in the partial translation information in the combination; and outputting the target language sentence.

12. A computer program product having a non-transitory Computer-readable medium including programmed instructions for performing a machine translation, wherein the instructions, in response to execution, cause a computer to perform:

inputting a source language sentence in a source language;

performing a morphological analysis on the source language sentence and outputting a sequence of morphemes of the source language sentence;

performing a syntactic analysis on the morphemes of the source language sentence and outputting a syntactic structure of the source language sentence;

extracting from the syntactic structure, if first nodes included in the syntactic structure serve as significant nodes, a first sub-string corresponding to a first partial structure including all leaf-ward nodes to be unified into each of the first nodes;

extracting from the syntactic structure, if second nodes which have a direct or indirect grammatical relation with the first nodes serve as the significant nodes, a second sub-string that corresponds to a second partial structure representing a difference between a partial structure including all leaf-ward nodes to be unified into each of the second nodes and the first partial structure;

translating the first sub-string and the second sub-string into a target language with each of a plurality of translation systems, and generating partial translation information in which translation scores representing translation certainties are associated with respective translation results of the plurality of translation systems;

selecting a combination from a plurality of combinations of items of the partial translation information, wherein the combination selected meets conditions that the first sub-string and the second sub-string that are originals of translation results included in items of the partial translation information do not overlap each other, that each of morphemes included in the source language sentence match one of the first sub-string and the second sub-string that are the originals of the translation results included in the partial translation information in the combination, and that a first plausibility calculated based on a subset of the translation scores included in the partial translation information to indicate certainty of the combination takes a largest value;

generating a target language sentence in the target language as a result of translating the source language sentence in a manner that the target language sentence has a subset of the translation results included in the partial translation information in the combination; and outputting the target language sentence.

* * * * *